United States Patent
Cheng et al.

(10) Patent No.: US 10,540,037 B2
(45) Date of Patent: Jan. 21, 2020

(54) FORCE DETECTION METHOD AND APPARATUS, AND ELECTRONIC TERMINAL

(71) Applicant: SHENZHEN GOODIX TECHNOLOGY CO., LTD., Shenzhen (CN)

(72) Inventors: Leigang Cheng, Shenzhen (CN); Dafei Wen, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 7 days.

(21) Appl. No.: 15/937,832

(22) Filed: Mar. 27, 2018

(65) Prior Publication Data

US 2018/0232096 A1    Aug. 16, 2018

Related U.S. Application Data

(63) Continuation of application No. PCT/CN2017/073243, filed on Feb. 10, 2017.

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0414* (2013.01); *G06F 3/0418* (2013.01); *G06F 2203/04105* (2013.01)

(58) Field of Classification Search
CPC .................. G06F 3/0414; G06F 3/044; G06F 2203/04103; G06F 2203/04105
See application file for complete search history.

(56) References Cited

U.S. PATENT DOCUMENTS

| 2011/0057899 | A1* | 3/2011 | Sleeman | G01L 1/146 345/174 |
|---|---|---|---|---|
| 2016/0299628 | A1 | 10/2016 | Ribeiro | |
| 2016/0349906 | A1 | 12/2016 | Lee et al. | |

(Continued)

FOREIGN PATENT DOCUMENTS

| CN | 105446538 A | 3/2016 |
|---|---|---|
| CN | 105511687 A | 4/2016 |

(Continued)

*Primary Examiner* — Yuzhen Shen

(57) ABSTRACT

Embodiments of the present application provide a force detection method, a force detection apparatus and an electronic terminal thereof. The force detection method includes: acquiring an output electrical signal of a voltage dividing capacitor formed between a driving electrode and a force sensing electrode, and an output electrical signal of a force detecting capacitor formed between the force sensing electrode and a reference electrode, determining force feature data when a force is applied to the force sensing electrode based on the output electrical signal of the voltage dividing capacitor and the output electrical signal of the force detecting capacitor. Based on the present application, the force detection model is simplified, the voltage variation amount is increased, the impacts caused by environment changes to the force performance are mitigated or eliminated, and environment self-calibration and self-calibration of an initial gap between the force sensing electrode and the reference electrode are implemented.

18 Claims, 15 Drawing Sheets

(56) References Cited

U.S. PATENT DOCUMENTS

| | | | |
|---|---|---|---|
| 2017/0371462 A1* | 12/2017 | Kim | G06F 3/0412 |
| 2018/0004306 A1* | 1/2018 | Ebisui | G06F 3/044 |
| 2018/0039367 A1* | 2/2018 | Suzuki | G06F 3/0414 |
| 2018/0059823 A1* | 3/2018 | Chang | G06F 3/044 |

FOREIGN PATENT DOCUMENTS

| | | |
|---|---|---|
| CN | 105675178 A | 6/2016 |
| CN | 105700753 A | 6/2016 |
| CN | 105807991 A | 7/2016 |
| CN | 205384592 U | 7/2016 |
| CN | 205809842 U | 12/2016 |
| CN | 206388153 U | 8/2017 |

\* cited by examiner

US 10,540,037 B2

FORCE DETECTION METHOD AND APPARATUS, AND ELECTRONIC TERMINAL

CROSS-REFERENCE TO RELATED APPLICATIONS

This application is a continuation of International Patent Application No. PCT/CN2017/073243, with an international filing date of Feb. 10, 2017, which is hereby incorporated by reference in its entirety.

TECHNICAL FIELD

Embodiments of the present application relate to the technical field of force detection, and in particular, relate to a force detection method and apparatus, and an electronic terminal.

BACKGROUND

The touch technology, when applied to a smart terminal, enables a user to operate the terminal only by means of gesture operations. As such, a traditional mechanical keyboard is not needed, such that man-machine interaction is simpler and more direct.

At present, in most electronic products, a user's finger touch on the display screen would generate a two-dimensional coordinate input. However, with the development of touch technologies, for example, capacitive touch, pure finger touch may not accommodate the demands of multi-dimensional input of the user. Deploying the force detection technology (Force Touch) in the capacitive touch screen may increase an input dimension, which allows the touch screen to sense force information of the finger, and sense a light force or a heavy force. In this way, when the user's finger applies a force on the display screen, not only a two-dimensional coordinate input may be generated, but also a third-dimension force input may be generated, and different functions are input correspondingly, such that a better user experience is provided. For example, in the force detection technology of the touch screen, generally touch display is implemented in combination with a display device by means of detecting variations of a capacitor formed between a force sensing electrode and a reference electrode in a force sensor.

In the structure of a conventional capacitance detection manner, two capacitors are present. One capacitor is a force detecting capacitor, and the force detecting capacitor is formed between a force sensing electrode and a reference electrode, a gap which deforms when a force is applied is present between the force sensing electrode and the reference electrode, the capacitance of the force detecting capacitor represents the variation of the force. In addition to the force detecting capacitor, an additional load capacitor is also present. The load capacitor is formed between the force sensing electrode and a load electrode, and a gap between the force sensing electrode and the load electrode almost does not vary when a force is applied. Based on a conventional force detection model, since the load capacitor is present, in one aspect, the force detection model is complicated, and in another aspect, the total capacitance is increased. As a result, a variation amount of a detection voltage is lowered. In addition, impacts caused by environment changes to the load capacitor may be equivalently embodied on the force detecting capacitor. In the related art, the load capacitor is defaulted to be constantly unchanged in the force detection model, and thus the impacts which caused by the environment changes to the force performance is severe. Lastly, with the presence of the load capacitor, in the force detection model in the related art, environment self-calibration and self-calibration of an initial gap between the force sensing electrode and the reference electrode may not be implemented due to an externally connected capacitor.

SUMMARY

Embodiments of the present application are intended to provide a force detection method and apparatus, and an electronic terminal, to at least solve the above technical problem in the related art.

To achieve the objectives of embodiments of the present application, embodiments of the present application provide a force detection method. The method includes:

acquiring an output electrical signal of a voltage dividing capacitor formed between a driving electrode and a force sensing electrode, and an output electrical signal of a force detecting capacitor formed between the force sensing electrode and a reference electrode, where a gap variable with force is present between the sensing electrode and the reference electrode; and determining force feature data when a force is applied to the force sensing electrode based on the output electrical signal of the voltage dividing capacitor and the output electrical signal of the force detecting capacitor.

Embodiments of the present application further provide a force detection apparatus. The force detection apparatus includes: a driving electrode, a force sensing electrode and a reference electrode; where a voltage dividing capacitor is formed between the driving electrode and the force sensing electrode, a force detecting capacitor is formed between the force sensing electrode and the reference electrode, a gap variable with force is present between the sensing electrode and the reference electrode, and the voltage dividing capacitor and the force detecting capacitor are respectively configured to determine an output electrical signal of force feature data when a force is applied to the force sensing electrode.

Embodiments of the present application further provide an electronic terminal. The electronic terminal includes the force detection apparatus based on any of the embodiments.

In the embodiments of the present application, an output electrical signal of a voltage dividing capacitor formed between a driving electrode and a force sensing electrode, and an output electrical signal of a force detecting capacitor formed between the force sensing electrode and a reference electrode are acquired; and force feature data when a force is applied to the force sensing electrode is determined based on the output electrical signal of the voltage dividing capacitor and the output electrical signal of the force detecting capacitor. This simplifies the force detection model, increases the voltage variation amount, mitigates or eliminates the impacts caused by environment changes to the force performance, and implements environment self-calibration and self-calibration of an initial gap between the force sensing electrode and the reference electrode.

DETAILED DESCRIPTION

Practice of the present application is described in detail with reference to drawings and specific embodiments, such that the practice of addressing the technical problem using the technical means based on the present application and achieving the technical effects may be better understood and conducted.

In the embodiments hereinafter of the present application, an output electrical signal of a voltage dividing capacitor formed between a driving electrode and a force sensing electrode, and an output electrical signal of a force detecting capacitor formed between the force sensing electrode and a reference electrode are acquired; and force feature data when a force is applied to the force sensing electrode is determined based on the output electrical signal of the voltage dividing capacitor and the output electrical signal of the force detecting capacitor. This simplifies the force detection model, increases the voltage variation amount, mitigates or eliminates the impacts caused by environment changes to the force performance, and implements environment self-calibration and self-calibration of an initial gap between the force sensing electrode and the reference electrode.

Figure 1:
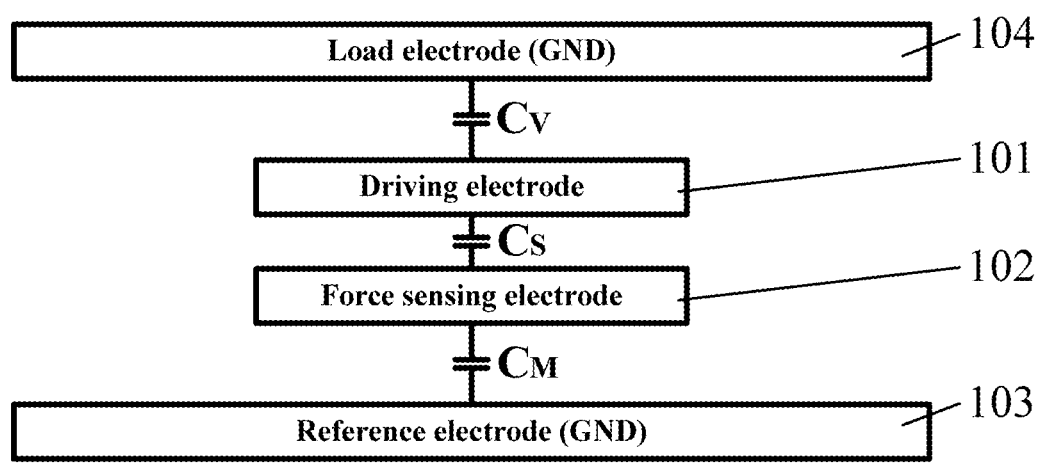
FIG. 1 is a schematic diagram of a laminated structure of a force detection apparatus based on the first embodiment of the present application.

FIG. 1 is a schematic diagram of a laminated structure of a force detection apparatus based on the first embodiment of the present application. As illustrated in FIG. 1, the force detection apparatus in this embodiment includes: a driving electrode 101, a force sensing electrode 102, and a reference electrode 103. The driving electrode 101 is specifically an electrode additionally arranged between the force sensing electrode 102 and a load electrode 104, for example, a Vcom layer, in the related art. The reference electrode 103 is specifically a conductive middle frame of an electronic terminal where the force detection apparatus is located. The reference electrode 103 is connected to the system ground. In this embodiment, the additionally arranged driving electrode 101 and the force sensing electrode 102 have the same shape and the same area.

In this embodiment, since the driving electrode 101 is additionally arranged, an environment detecting capacitor $C_V$ is formed between the additionally arranged driving electrode 101 and the load electrode 104, for example, the Vcom layer. Alternatively, another conductive surface that is closest to the force sensing electrode in addition to the reference electrode 103 and the driving electrode 101 may also be used as the load electrode 104, as long as the environment detecting capacitor $C_V$ is formed between the conductive surface and the driving electrode 101. A voltage dividing capacitor $C_S$ is formed between the driving electrode 101 and the force sensing electrode 102. The voltage dividing capacitor $C_S$ generates a corresponding output electrical signal when a force is applied to the force sensing electrode. In this embodiment, a gap variable with force is present between the force sensing electrode 102 and the reference electrode 103, such that the force detecting capacitor $C_M$ formed between the force sensing electrode 102 and the reference electrode 103 may vary with the variation of the gap, and the force detecting capacitor $C_M$ generates a corresponding output electrical signal when a force is applied to the force sensing electrode. The output electrical signal may reflect the variation of the force detecting capacitor, such that force feature data when a force is applied to the force sensing electrode 102 is determined based on the output electrical signal of the voltage dividing capacitor $C_S$ and the output electrical signal of the force detecting capacitor $C_M$.

Figure 2:
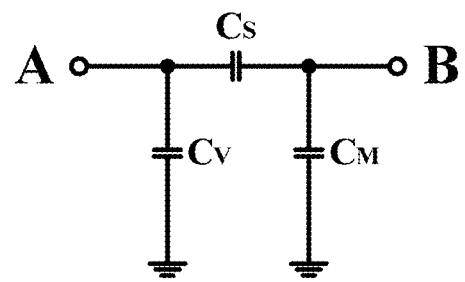
FIG. 2 is a schematic diagram of an equivalent circuit of a force detection apparatus based on the second embodiment of the present application.
Figure 3:
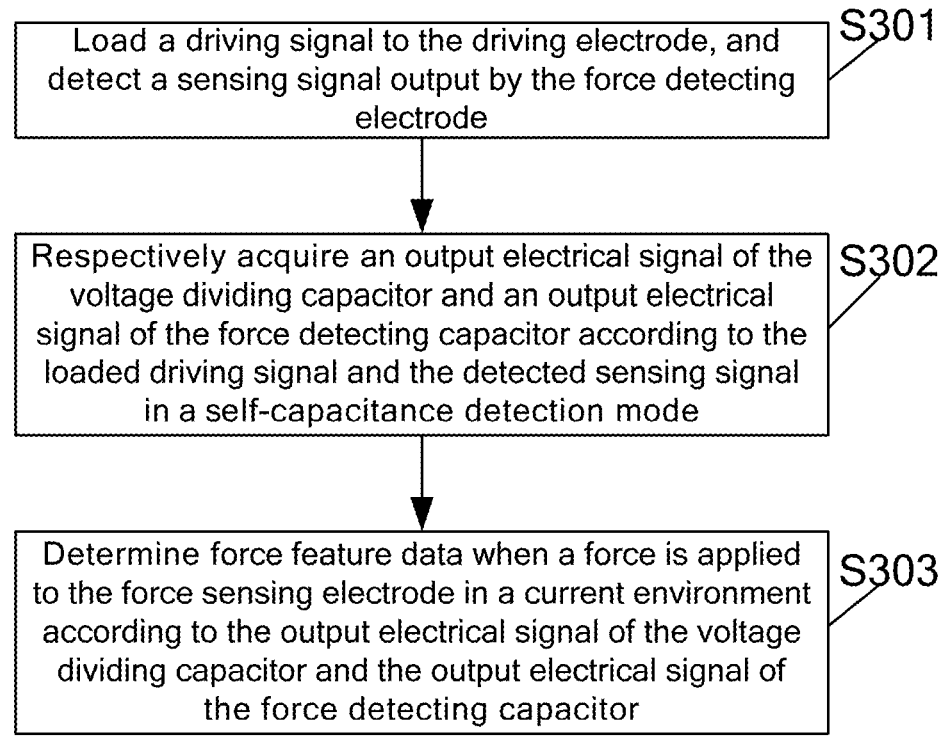
FIG. 3 is a schematic flowchart of a force detection method based on the third embodiment of the present application.

FIG. 2 is a schematic diagram of an equivalent circuit of a force detection apparatus based on the second Embodiment of the present application. As illustrated in FIG. 2, point A corresponds to the driving electrode 101, and point B corresponds to the force sensing electrode 102, which correspond to the laminated structure in FIG. 1. In this embodiment, circuit connections between the environment detecting capacitor $C_V$, the voltage dividing capacitor $C_S$ and the force detecting capacitor $C_M$ are as illustrated in FIG. 2. The voltage dividing capacitor $C_S$ and the force detecting capacitor $C_M$ are connected in series. Due to a low output impedance of the driving electrode 101, the environment detecting capacitor $C_V$ basically causes no impact on the driving signal. Therefore, the force feature data may be determined based on a voltage division relationship between the voltage dividing capacitor $C_S$ and the force detecting capacitor $C_M$. The specific technical process of determining the force feature data may be referenced to the method embodiment as illustrated in FIG. 3.

In the embodiment as illustrated in FIG. 1, since the driving electrode 101 isolates the force sensing electrode 102 from the load electrode 104, a load capacitor $C_L$ formed between the force sensing electrode 102 and the load electrode 104 is transformed to: connection in series of the voltage dividing capacitor $C_S$ and the environment detecting capacitor $C_V$, which is essentially equivalent to separating the load capacitor $C_L$ from the force detecting capacitor $C_M$. In this way, under the circumstance where the same force generates the same $\Delta C_M$, a higher voltage signal variation amount may be obtained, and thus the signal-to-noise ratio (SNR) of force detection is improved accordingly. The specific exemplary interpretation is as follows:

$$\Delta U_1 \approx U_{TX} \frac{\Delta C_M}{4(C_V + C_M)} \quad (1)$$

$$\Delta U_2 \approx U_{TX} \frac{\Delta C_M}{4 C_M}$$

In formula (1), $\Delta U_1$ denotes a voltage variation amount of the force detecting capacitor $C_M$ in the self-capacitance force detection solution in the related art, $\Delta U_2$ denotes a voltage variation amount of the force detecting capacitor $C_M$ in the first embodiment, and $\Delta C_M$ denotes a variation amount of the force detecting capacitor $C_M$ when a force is applied relative to a reference force detecting capacitor $C_{M0}$ when no force is applied. As known from the above formula, $\Delta U_2$ is greater than $\Delta U_1$. Assume that the capacitance of the environment detecting capacitor $C_V$ is N times the capacitance of the force detecting capacitor $C_M$, then the SNR is also improved by N times.

FIG. 3 is a schematic flowchart of a force detection method based on the third Embodiment of the present application. As illustrated in FIG. 3, the method includes the following steps:

S301: A driving signal is loaded to the driving electrode, and a sensing signal output by the force detecting electrode is detected.

In this embodiment, the driving electrode is electrically connected to a driving circuit which provides a driving signal, and the driving circuit loads an alternating current signal having constant amplitude, for example, a sine wave, to the driving electrode 101 by means of coding; and the force sensing electrode is electrically connected to a detection circuit, and thus detects, via the detection circuit, a sensing signal output by the force sensing electrode 102 that is coupled to the driving signal. Specifically, referring to FIG. 2, the alternating current signal (that is, the driving signal) having constant amplitude is loaded to point A in FIG. 2; whereas the sensing signal output by the force sensing electrode 102 is detected at point B.

S302: In a self-capacitance detection mode, an output electrical signal of the voltage dividing capacitor and an output electrical signal of the force detecting capacitor are respectively acquired based on the loaded driving signal and the detected sensing signal.

In this embodiment, the output electrical signal of the voltage dividing capacitor $C_S$ and the output electrical signal of the force detecting capacitor $C_M$ may be respectively a voltage across the voltage dividing capacitor $C_S$ and a voltage across the voltage detecting capacitor $C_M$.

S303: Force feature data when a force is applied to the force sensing electrode in a current environment is determined based on the output electrical signal of the voltage dividing capacitor and the output electrical signal of the force detecting capacitor.

In this embodiment, the determining force feature data when a force is applied to the force sensing electrode 12 based on the output electrical signal of the voltage dividing capacitor $C_S$ and the output electrical signal of the force detecting capacitor $C_M$ in step S303 may include the following steps:

S313: A signal value of the output electrical signal of the voltage dividing capacitor $C_S$ is divided by a sum of signal values of signal values of the output electrical signal of the voltage dividing capacitor $C_S$ and the output electrical signal of the force detecting capacitor $C_M$, to determine a first voltage division ratio.

Specifically, the first voltage division ratio is calculated based on formula (2):

$$\text{Rate} = \frac{C_S}{C_S + C_M} \quad (2)$$

In formula (2), $C_S$ denotes a capacitance of the voltage dividing capacitor, and $C_M$ denotes a capacitance of the force detecting capacitor.

S323: Force feature data of the force sensing electrode when a force is applied in a current environment is determined based on the first voltage division ratio.

Further, the determining force feature data of the force sensing electrode when a force is applied in the current environment based on the first voltage division ratio in step S323 may specifically include the following steps:

S3231: A ratio of the signal value of the output electrical signal of the voltage dividing capacitor $C_S$ to the signal value of the output electrical signal of the force detecting capacitor $C_M$ based on the first voltage division ratio.

S3232: The force feature data when a force is applied to the force sensing electrode 102 is determined based on the ratio of the signal value of the output electrical signal of the voltage dividing capacitor $C_S$ to the signal value of the output electrical signal of the force detecting capacitor $C_M$.

$$ForceData = \frac{1}{\frac{1}{Rate}-1} = \frac{C_S}{C_M} \quad (3)$$

In formula (3), ForceData denotes the force feature data of the force sensing electrode 102 when a force is applied in the current environment.

Based on the above embodiment, after the force feature data is calculated, the method further includes: determining a force corresponding to the force feature data based on the force feature data when a force is applied to the force sensing electrode 102 in the current environment and reference force feature data when no force is applied to the force sensing electrode in the current environment.

$$C_M = \frac{\varepsilon_M S}{(d_{M0} - kF)} \quad (4)$$

In formula (4), $d_{M0}$ denotes an initial spacing between the force sensing electrode 102 and the reference electrode 103, $\varepsilon_M$ denotes an equivalent dielectric constant between the force sensing electrode 102 and the reference electrode 103, S denotes an opposing area between the force sensing electrode 102 and the reference electrode 103, k denotes an elastic modulus of a force-applied surface for force detection in an electronic terminal, that is, a deformation amount transformed from the force, with the unit of m/g, and F denotes a force value of the force is applied to the force sensing electrode 102.

By introducing formula (4) into formula (3), the following formula (5) is obtained:

$$ForceData = \frac{1}{\frac{1}{Rate}-1} = \frac{C_S}{C_M} = \frac{C_S(d_{M0}-kF)}{\varepsilon_M S} = \frac{C_S d_{M0}}{\varepsilon_M S} - \frac{C_S k}{\varepsilon_M S}F \quad (5)$$

Since the force feature data ForceData is known, in formula (5), except the force value F, the other parameters are all known or may be measured or calibrated. Therefore, the force value F corresponding to the force feature data may be calculated by using formula (5).

Figure 4:
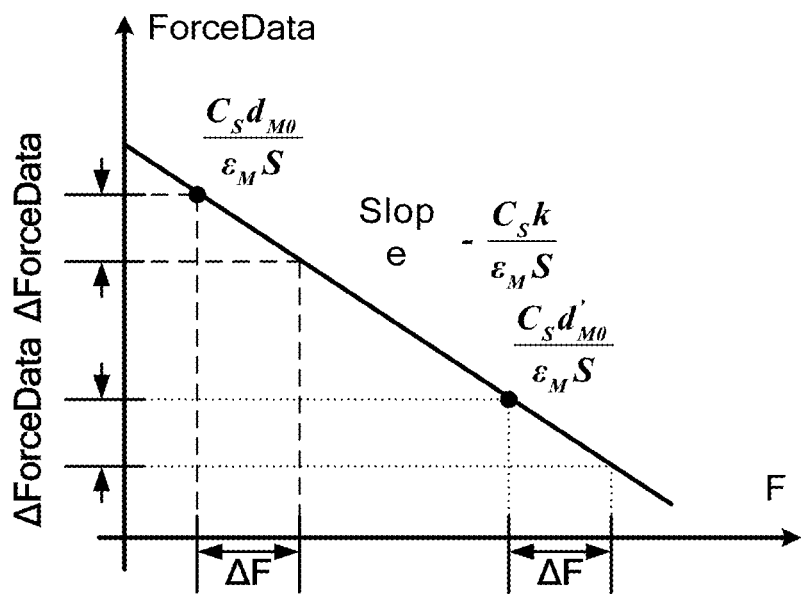
FIG. 4 is a schematic diagram of a relationship between force feature data and force values based on the fourth embodiment of the present application.

FIG. 4 is a schematic diagram of a relationship between force feature data and force values based on the forth embodiment of the present application. As illustrated in FIG. 4, referring to formula (5), the force feature data ForceData and the force value F are in a linear relationship. When the initial spacing $d_{M0}$ between the force sensing electrode 102 and the reference electrode 103 during delivery from factory is changed, a current initial spacing $d'_{M0}$ is obtained. Based on formula (5), reference force feature data ForceData'$_0$, when no force is applied in the current environment may be obtained.

$$ForceData'_0 = \frac{C_S d'_{M0}}{\varepsilon_M S} \quad (6)$$

With reference to formula (5), force feature data ForceData' when a force is applied after the initial spacing during delivery from factory is changed is obtained.

$$ForceData' = \frac{C_S d'_{M0}}{\varepsilon_M S} - \frac{C_S k}{\varepsilon_M S}F \quad (7)$$

A feature data difference ΔForceData is obtained by a subtraction between ForceData' and ForceData'$_0$ calculated based on formula (7).

$$\Delta ForceData = \frac{C_S k}{\varepsilon_M S}F \quad (8)$$

Further, the force value F when a force is applied is determined based on the feature data difference. Accordingly, based on the embodiments as illustrated in FIG. 3, when the force value F is calculated by calculating the force feature data difference, the reference force feature data reflecting the impacts of the initial spacing is offset, such that the force value F is not affected by the change of the initial spacing. In this way, self-calibration of the initial gap is implemented.

Figure 5:
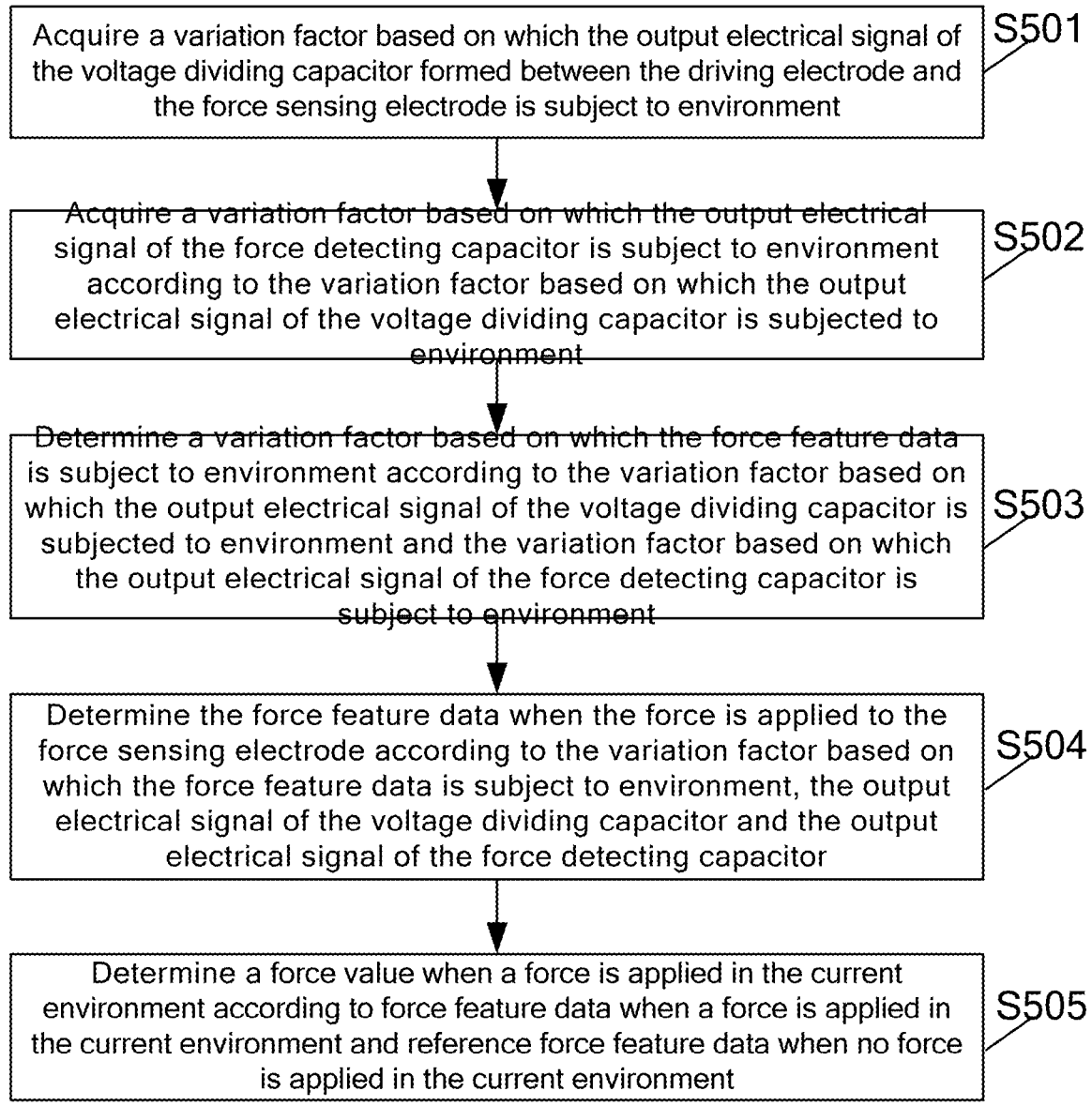
FIG. 5 is a schematic flowchart of a force detection method based on the fifth embodiment of the present application.

FIG. 5 is a schematic flowchart of a force detection method based on the fifth embodiment of the present application. As illustrated in FIG. 5, in this embodiment, description is given by using the case where the temperature or humidity in an environment affects the force feature data as an example. Specifically, the method includes the following steps:

S501: A variation factor based on which the output electrical signal of the voltage dividing capacitor formed between the driving electrode and the force sensing electrode is subject to environment is acquired.

In this embodiment, the gap, the opposing area and the dielectric constant between the driving electrode 101 and the force sensing electrode 102 vary under the impacts of the temperature and humidity in the environment. The variation is directed reflected on the output electrical signal of the voltage dividing capacitor $C_S$. Therefore, the variation factor based on which the output electrical signal of the voltage dividing capacitor $C_S$ is subject to environment is calculated by measuring the ratio of a real-time output electrical signal of the voltage dividing capacitor $C_S$ in the current environment to a reference output electrical signal of the voltage dividing capacitor $C_S$ in a predetermined fixed environment.

Specifically, description is given with reference to formula (5), and the variation factor $\lambda_{CS}$ based on which the output electrical signal of the voltage dividing capacitor $C_S$ is subject to environment is calculated by using the following formula:

$$\lambda_{CS} = \frac{C_{ST}}{C_{S0}} \quad (9)$$

In formula (9), $C_{S0}$ denotes a reference coupling capacitor of the voltage dividing capacitor in the predetermined fixed environment, for example, a delivery-from-factory environment. Analogously, the variation factor $\lambda_{CS}$ based on which the output electrical signal of the voltage dividing capacitor $C_S$ is subject to environment is determined based on the reference output electrical signal of the voltage dividing capacitor $C_S$ in the predetermined fixed environment and the real-time output electrical signal of the voltage dividing capacitor in the current environment. It should be noted that during determination of the variation factor based on which the output electrical signal is subject to environment, the variation factor may be determined when a force is applied to the force sensing electrode, or may be determined when no force is applied to the force sensing electrode, which is not described herein any further.

In this embodiment, during determination of the reference output electrical signal or the real-time output electrical signal, the driving signal may be loaded to the driving electrode 101 in the corresponding predetermined fixed environment or in the corresponding current environment, and the sensing signal of the force sensing electrode 102 is detected in a mutual-capacitance detection mode, such that the reference output electrical signal in the predetermined fixed environment and the real-time output electrical signal in the current environment are determined. In this way, the variation factor $\lambda_{CS}$ based on which the output electrical signal of the voltage dividing capacitor $C_S$ is subject to environment is determined by comparing the real-time output electrical signal of the voltage dividing capacitor $C_S$ in the current environment with the reference output electrical signal of the voltage dividing capacitor $C_S$ in the predetermined fixed environment.

S502: A variation factor based on which the output electrical signal of the force detecting capacitor is subject to environment is acquired based on the variation factor based on which the output electrical signal of the voltage dividing capacitor is subjected to environment.

Referring to step S502, the dielectric constant of a dielectric between the driving electrode 101 and the force sensing electrode 102 varies under the impacts of the temperature and humidity in the environment. Likewise, the dielectric constant of a dielectric between the force sensing electrode 102 and the reference electrode 103 also varies under the impacts of the environment. The variation factor based on which the output electrical signal of the force detecting capacitor $C_M$ is subject to environment may be calibrated based on the variation factor based on which the output electrical signal of the voltage dividing capacitor $C_S$ is subject to environment determined in step S501. In this way, the voltage dividing capacitor $C_S$ is used as an environment sensor, and thus the impacts caused by the variation of the environment to the variation of the force detecting capacitor $C_M$ is determined by using the environment sensor.

In this embodiment, through material test in advance, a relationship between the variation factor based on which the output electrical signal of the voltage dividing capacitor $C_S$ is subject to environment and the variation factor based on which the electrical signal of the force detecting capacitor $C_M$ is subject to environment is established, and then the variation factor based on which the output electrical signal of the voltage dividing capacitor $C_S$ is subject to environment is calculated through step S501. In this way, the variation factor km based on which the output electrical signal of the force detecting capacitor $C_M$ is subject to environment is determined.

S503: A variation factor based on which the force feature data is subject to environment is determined based on the variation factor based on which the output electrical signal of the voltage dividing capacitor is subjected to environment and the variation factor based on which the output electrical signal of the force detecting capacitor is subject to environment.

In this embodiment, the variation factor based on which the force feature data is subject to environment is determined based on a ratio of the variation factor based on which the output electrical signal of the voltage dividing capacitor is subjected to environment to the variation factor based on which the output electrical signal of the force detecting capacitor is subject to environment.

Specifically, referring to formula (10), the variation factor), based on which the force feature data is subject to environment is as follows:

$$\lambda = \frac{\lambda_{CS}}{\lambda_{\varepsilon M}} \quad (10)$$

S504: The force feature data when the force is applied to the force sensing electrode is determined based on the variation factor based on which the force feature data is subject to environment, the output electrical signal of the voltage dividing capacitor and the output electrical signal of the force detecting capacitor.

In this embodiment, referring to formula (5), the force feature data ForceData' that is subject to environment when a force is applied is represented by the following formula:

$$ForceData' = \frac{1}{\frac{1}{Rate} - 1} = \lambda \frac{C_S}{C_M} = \frac{\lambda C_S(d_{M0} - kF)}{\varepsilon_M S} = \frac{\lambda C_S d_{M0}}{\varepsilon_M S} - \frac{\lambda C_S k}{\varepsilon_M S} F \quad (11)$$

Figure 6:
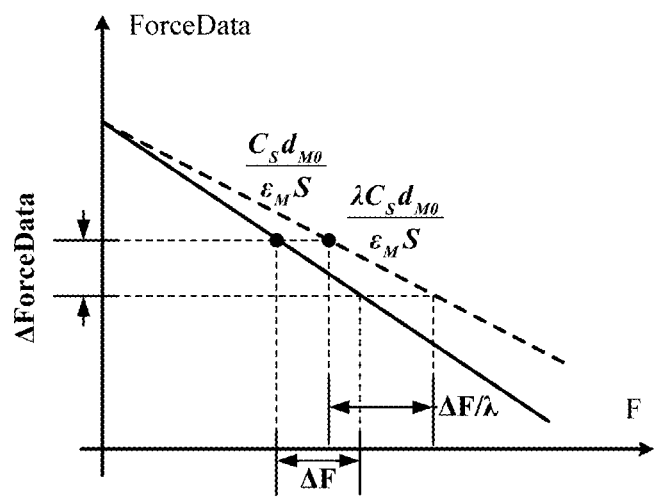
FIG. 6 is a schematic diagram of a curve of practicing force feature data when a force is applied based on the sixth embodiment of the present application.

Formula (11) is illustrated in FIG. 6 with a dotted line, where the slope of the dotted line is $$-\frac{\lambda C_S k}{\varepsilon_M S}.$$

Formula (5) is illustrated in FIG. 6 with a solid line, where the slope of the solid line is $$-\frac{C_S k}{\varepsilon_M S}.$$

In another embodiment, alternatively, a variation factor based on which the force detecting electrode is subject to environment may be further acquired based on a variation factor based on which the voltage dividing capacitor is subject to environment, and the output electrical signal of the force detecting capacitor may be calibrated based on the variation factor based on which the force sensing capacitor is subject to environment. In this way, the force feature data of the force sensing electrode when a force is applied in the current environment based on the calibrated output electrical signal of the voltage dividing capacitor and the calibrated output electrical signal of the force detecting capacitor. It should be noted that in another embodiment, if the environment causes no impact to the force detecting capacitor, the output electrical signals of the voltage dividing capacitor and the force detecting capacitor may be calibrated, which is not described herein any further.

S505: A force value when a force is applied in the current environment is determined based on force feature data when a force is applied in the current environment and reference force feature data when no force is applied in the current environment.

In this embodiment, the force feature data difference ΔForceData' in the current environment may be calculated by using the following formula:

$$\Delta ForceData' = \frac{\lambda C_S k}{\varepsilon_M S} F \quad (12)$$

Formula (13) is obtained by transforming formula (12), and a force value F when a force is applied in the current environment is calculated by using the following formula:

$$\frac{\Delta ForceData'}{\lambda} = \frac{C_S k}{\varepsilon_M S} F \quad (13)$$

As seen from formula (13), the force feature data difference ΔForceData' is calibrated based on the variation factor λ based on which the force feature data is subject to environment, and hence the force value F is calculated. The details may be referenced to FIG. 6. FIG. 6 is a schematic diagram of a curve of practicing force feature data when a force is applied based on the sixth embodiment of the present application.

Figure 7:
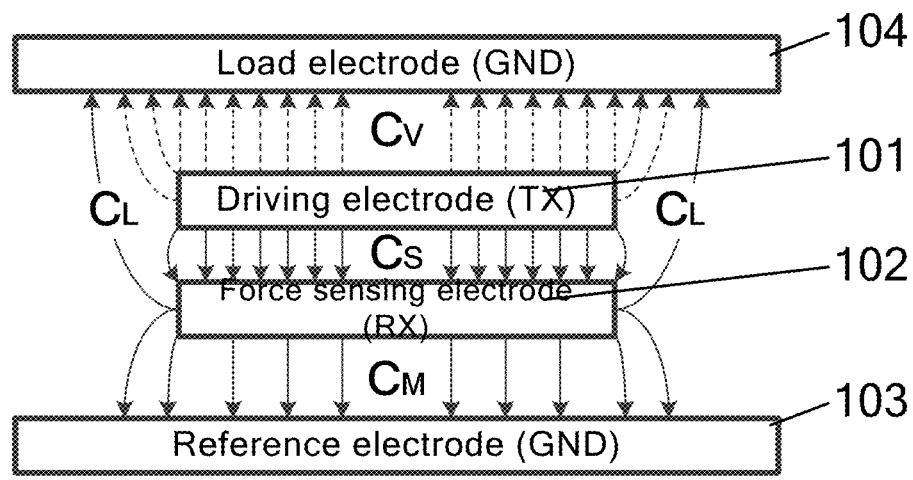
FIG. 7 is a schematic structural diagram of a force detection apparatus based on the seventh embodiment of the present application.
Figure 8:
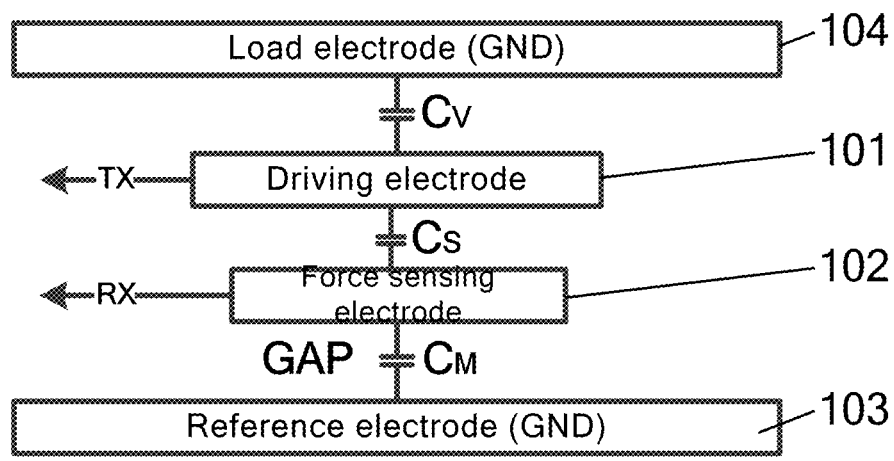
FIG. 8 is a schematic structural diagram of a force detection apparatus based on the eighth embodiment of the present application.
Figure 9:
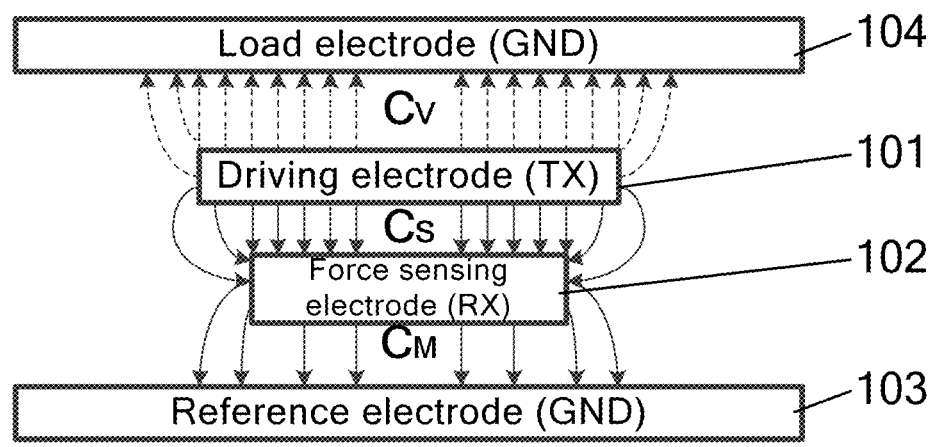
FIG. 9 is a schematic diagram of electric field distribution of a force detection apparatus based on the ninth embodiment of the present application.

FIG. 7 is a schematic structural diagram of a force detection apparatus based on the seventh embodiment of the present application. As illustrated in FIG. 7, based on the embodiment as illustrated in FIG. 1, a small part of the load capacitor $C_L$ may remain between the edges of the load capacitor 104 (for example, a Vcom layer) and the force sensing electrode. The load capacitor $C_L$ may cause impacts to the performance of real-time force detection. Accordingly, referring to FIG. 8, FIG. 8 is a schematic structural diagram of a force detection apparatus based on the eighth embodiment of the present application. As illustrated in FIG. 8, to eliminate the impacts caused by the load capacitor $C_L$, in the embodiment as illustrated in FIG. 8, an area of the driving electrode 101 is greater than that of the force sensing electrode, and the driving electrode covers the force sensing electrode to shield the load capacitor $C_L$ as illustrated in FIG. 7. Referring to FIG. 9, FIG. 9 is a schematic diagram of electric field distribution of a force detection apparatus based on the ninth embodiment of the present application. Since the area of the driving electrode 101 is greater than that of the force sensing electrode 102, the load capacitor $C_L$ formed between the edge of the force sensing electrode 102 and the Vcom layer is extremely small, and thus the impacts caused to the force detection performance may be neglected.

The above method embodiment illustrating determination of the force feature data and the corresponding force value may be also applicable to the laminated structure of the force detection apparatus as illustrated in FIG. 8, which is not described herein any further.

Figure 10:
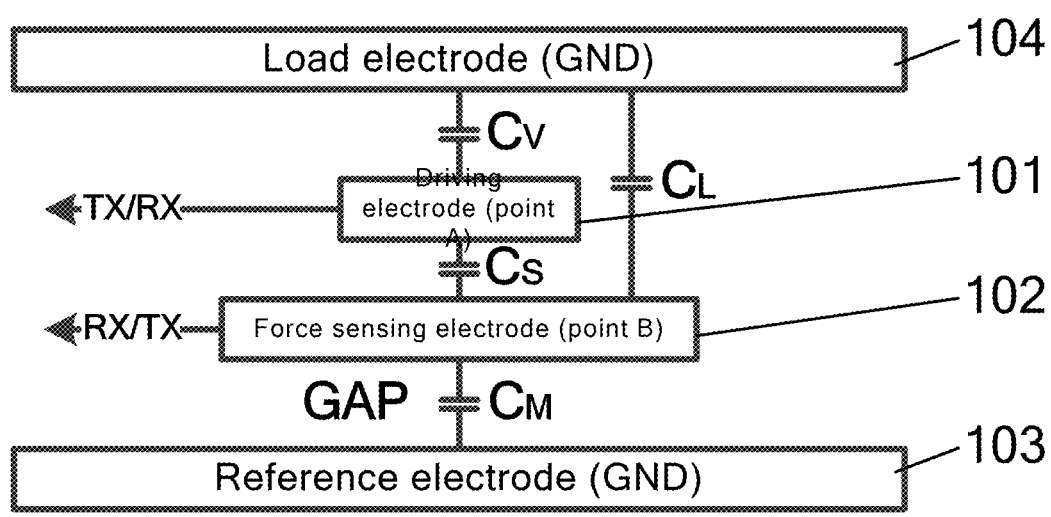
FIG. 10 is a schematic structural diagram of a force detection apparatus based on the tenth embodiment of the present application.

FIG. 10 is a schematic structural diagram of a force detection apparatus based on the tenth embodiment of the present application. As illustrated in FIG. 10, in this embodiment, an area of the force sensing electrode 102 is greater than that of the driving electrode 101. Therefore, the load capacitor $C_L$ is formed between the force sensing electrode 102 and the load electrode 104, for example, the Vcom layer. In addition, the dividing capacitor $C_S$ is formed between the force sensing electrode 102 and the driving electrode 101, the force detecting capacitor $C_M$ is formed between the force sensing electrode 102 and the reference electrode 103, and the environment detecting capacitor $C_L$ is formed between the driving electrode 1001 and the load electrode 104, for example, the Vcom layer.

Figure 11:
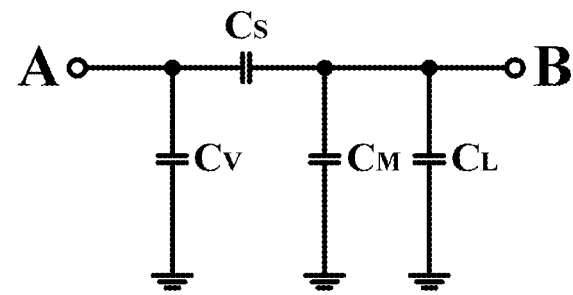
FIG. 11 is a schematic structural diagram of an equivalent circuit of a force detection apparatus based on the eleventh embodiment of the present application.

FIG. 11 is a schematic structural diagram of an equivalent circuit of a force detection apparatus based on the eleventh embodiment of the present application. As illustrated in FIG. 11, with respect to the equivalent circuit structure established for the force detection apparatus as illustrated in FIG. 10, the force detecting capacitor $C_M$ is connected in parallel to the load capacitor $C_L$ and the connected in series to the voltage dividing capacitor $C_S$. Since the driving electrode has a low output impedance, the environment detecting capacitor $C_Y$ almost causes no impact to the driving signal.

In addition, it should be noted that FIG. 10 is merely an exemplary structure of the formed load capacitor. For example, the structure in FIG. 7 may also form a load capacitor, and reference may be made to the equivalent circuit structure as illustrated in FIG. 11, which is not described herein any further.

Figure 12:
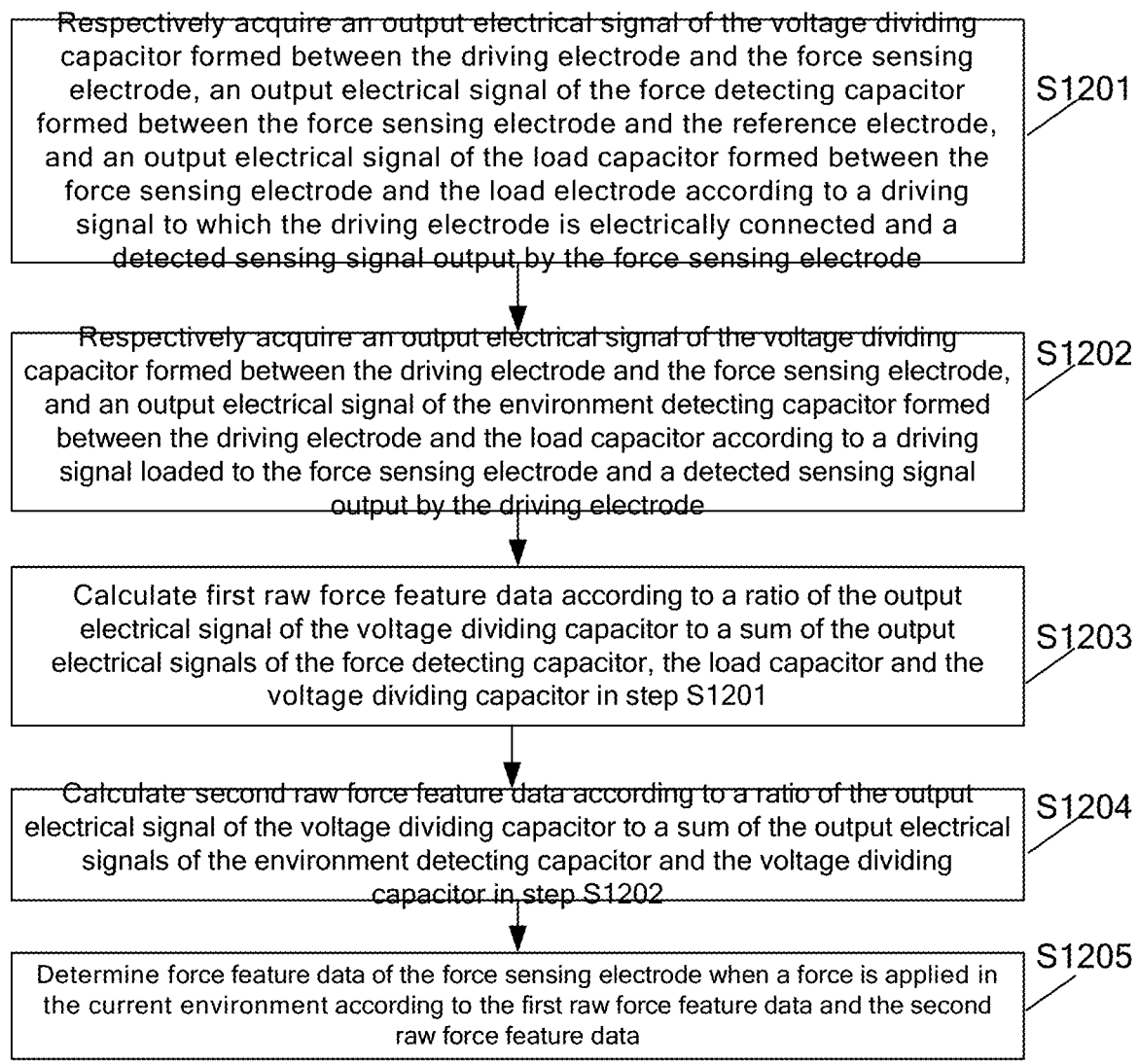
FIG. 12 is a schematic flowchart of a force detection method based on the twelfth embodiment of the present application.

With respect to the structure of the load capacitor as exemplarily illustrated in FIG. 7 or FIG. 10, determination of the force feature data may be referenced to FIG. 12.

FIG. 12 is a schematic flowchart of a force detection method based on the twelfth embodiment of the present application. As illustrated in FIG. 12, the method includes the following steps.

S1201: An output electrical signal of the voltage dividing capacitor formed between the driving electrode and the force sensing electrode, an output electrical signal of the force detecting capacitor formed between the force sensing electrode and the reference electrode, and an output electrical signal of the load capacitor formed between the force sensing electrode and the load electrode are respectively acquired based on a driving signal to which the driving electrode is electrically connected and a detected sensing signal output by the force sensing electrode.

In this embodiment, the step of loading the driving signal to the driving electrode 101 and acquiring the output electrical signals of various capacitors based on the sensing signal output by the force sensing electrode 102 is similar to that in the detection method as illustrated in FIG. 1, which is not described herein any further.

S1202: An output electrical signal of the voltage dividing capacitor formed between the driving electrode and the force sensing electrode, and an output electrical signal of the environment detecting capacitor formed between the driving electrode and the load capacitor are respectively acquired based on a driving signal loaded to the force sensing electrode and a detected sensing signal output by the driving electrode.

In this embodiment, the step of loading the driving signal to the force sensing electrode 102 and acquiring the output electrical signals of various capacitors based on the sensing signal output by the driving electrode 101 are similar to step S1201.

S1203: First raw force feature data is calculated based on a ratio of the output electrical signal of the voltage dividing capacitor to a sum of the output electrical signals of the force detecting capacitor, the load capacitor and the voltage dividing capacitor in step S1201.

Figure 13:
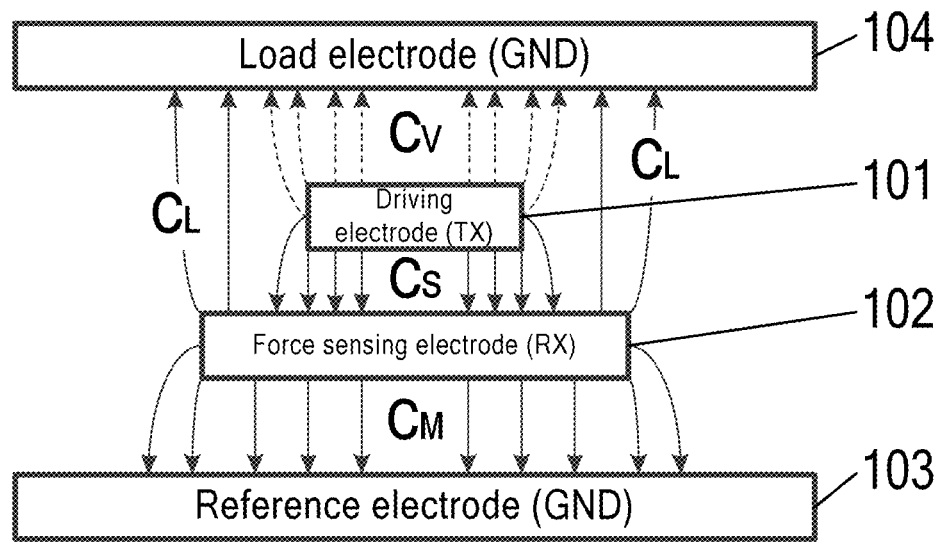
FIG. 13 is a schematic diagram of an electric field of a force detection apparatus based on the thirteenth embodiment of the present application.

In this embodiment, FIG. 13 is a schematic diagram of an electric field of a force detection apparatus based on the thirteenth embodiment of the present application. Based on the electric field, the ratio $\text{Rate}_1$ of the output electrical signal of the voltage dividing capacitor $C_S$ to the sum of the output electrical signals of the force detecting capacitor $C_M$, the load capacitor and the voltage dividing capacitor $C_S$, and the first raw force feature data $\text{RawData}_1$ be respectively calculated by using formula (14).

$$\text{Rate}_1 = \frac{C_S}{C_S + C_M + C_L} \quad (14)$$

$$\text{RawData}_1 = \frac{1}{\text{Rate}_1} - 1 = \frac{C_M + C_L}{C_S}$$

S1204: Second raw force feature data is calculated based on a ratio of the output electrical signal of the voltage dividing capacitor to a sum of the output electrical signals of the environment detecting capacitor and the voltage dividing capacitor in step S1202.

Figure 14:
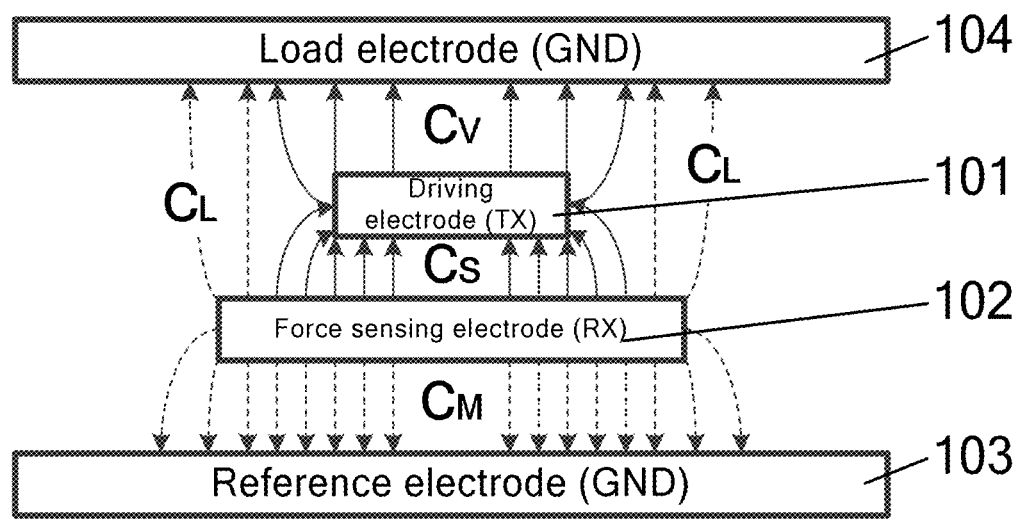
FIG. 14 is a schematic diagram of an electric field of a force detection apparatus based on the fourteenth embodiment of the present application.

In this embodiment, FIG. 14 is a schematic diagram of an electric field of a force detection apparatus based on the fourteenth embodiment of the present application. Specifically, based on formula (15), a signal value of the output electrical signal of the environment detecting capacitor $C_V$ is divided by a sum of signal values of the output electrical signals of the environment detecting capacitor $C_V$ and the voltage dividing capacitor $C_S$, and a second voltage division ratio $\text{Rate}_2$ and the second raw force feature data $\text{RawData}_2$ are determined. The second raw force feature data is equivalent to environment feature data in the current environment. In formula (15), the output electrical signal of the environment detecting capacitor $C_V$ is specifically a voltage signal $U_{CV}$, and the output electrical signal of the voltage dividing capacitor $C_S$ is specifically $U_{CS}$.

$$U_{CS} = \frac{\frac{1}{jwC_S}}{\frac{1}{jwC_V} + \frac{1}{jwC_S}} U_{TX} \quad (15)$$

$$U_{CV} = \frac{\frac{1}{jwC_V}}{\frac{1}{jwC_V} + \frac{1}{jwC_S}} U_{TX}$$

$$\text{Rate}_2 = \frac{U_{CV}}{U_{CV} + U_{CS}} = \frac{\frac{1}{jwC_V}}{\frac{1}{jwC_V} + \frac{1}{jwC_S}} = \frac{C_S}{C_V + C_S}$$

$$\text{RawData}_2 = \frac{1}{\text{Rate}_2} - 1 = \frac{C_V}{C_S}$$

In this embodiment, in step S1204, the second ratio is acquired based on the signal value of the output electrical signal of the voltage dividing capacitor $C_S$ and the sum of the signal values of the output electrical signals of the environment detecting capacitor $C_V$ and the voltage dividing capacitor $C_S$, and the second raw force feature data is calculated. The output electrical signal of the load capacitor v may be determined based on a proportional relationship between the load capacitor $C_L$ and the environment detecting capacitor $C_V$, and the output electrical signal of the environment detecting capacitor $C_V$.

S1205: Force feature data of the force sensing electrode when a force is applied in the current environment is determined based on the first raw force feature data and the second raw force feature data.

In this embodiment, in practical products, the distance from the driving electrode 101 to the load electrode 104, for example, the Vcom layer, is approximately equal to the distance from the force sensing electrode 102 to the load electrode 104, for example, the Vcom layer; and the dielectric constant between the driving electrode 101 and the load electrode 104 is substantially equal to the dielectric constant between the force sensing electrode 102 and the load electrode 104. Therefore, the capacitance values are different mainly because the opposing areas between the driving electrode 101 and the load electrode 104 and between the force sensing electrode 102 and the load electrode 104 are different. As such, the environment detecting capacitor $C_V$ and the load capacitor $C_L$ are subject to a fixed proportional relationship as illustrated in the following formula:

$$C_L = \eta C_V \quad (16)$$

Two sides of the formula of $\text{RawDate}_2$ in formula (15) are multiplied by $\eta$, and then the force feature data ForceData" is calculated by using the following formula:

$$\text{ForceData}'' = \frac{1}{\text{RawData}_1 - \eta \text{RawData}_2} = \frac{C_S}{C_M} \quad (17)$$

Then formula (4) is introduced into formula (17) to obtain the following formula for calculating force feature data ForceData":

$$\text{ForceData}'' = \frac{1}{\text{RawData}_1 - \eta \text{RawData}_2} = \quad (18)$$

$$\frac{C_S}{C_M} = \frac{C_S(d_{M0} - kF)}{\varepsilon_M S} = \frac{C_S d_{M0}}{\varepsilon_M S} - \frac{C_S k}{\varepsilon_M S} F$$

Further, to determine the force value corresponding to the force feature data, in formula (18), let F be 0, and hence reference force feature data $\text{ForceData}''_0$ when no force is applied is obtained. When a force is applied, a formula similar to formula (8) may be obtained by carrying out a subtraction operation between the force feature data ForceData" determined based on the first raw force feature data and the second raw force feature data and the reference force feature data $\text{ForceData}''_0$. In this way, the force value F is calculated by using the formula similar to formula (8).

With respect to the similar scenario where the load capacitor is present, descriptions of the initial spacing self-calibration and the environment self-calibration, and the signal-to-noise ratio may be referenced to the description of the detection method as illustrated in FIG. 1, which are not given herein any further.

Figure 15:
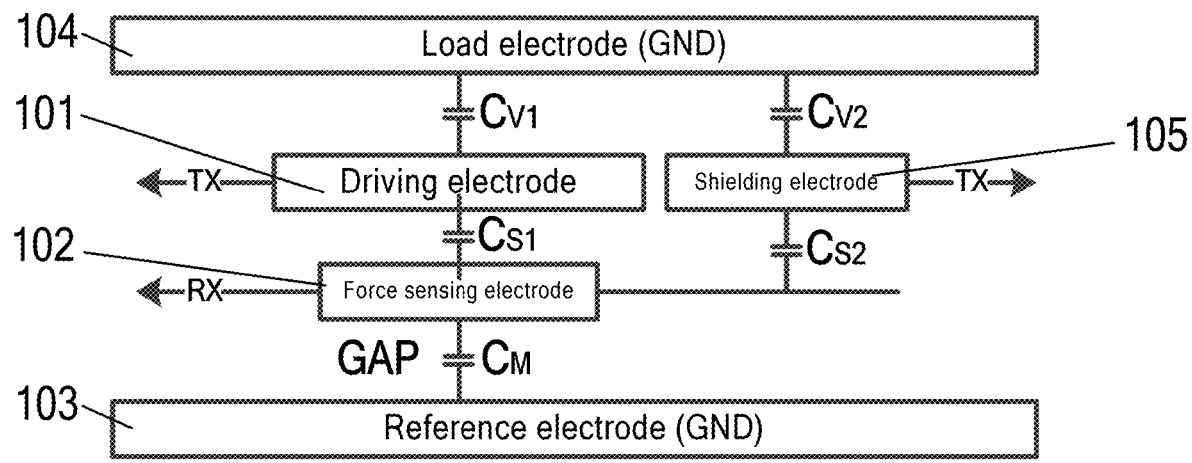
FIG. 15 is a schematic diagram of a laminated structure of a force detection apparatus based on the fifteenth embodiment of the present application.
Figure 16:
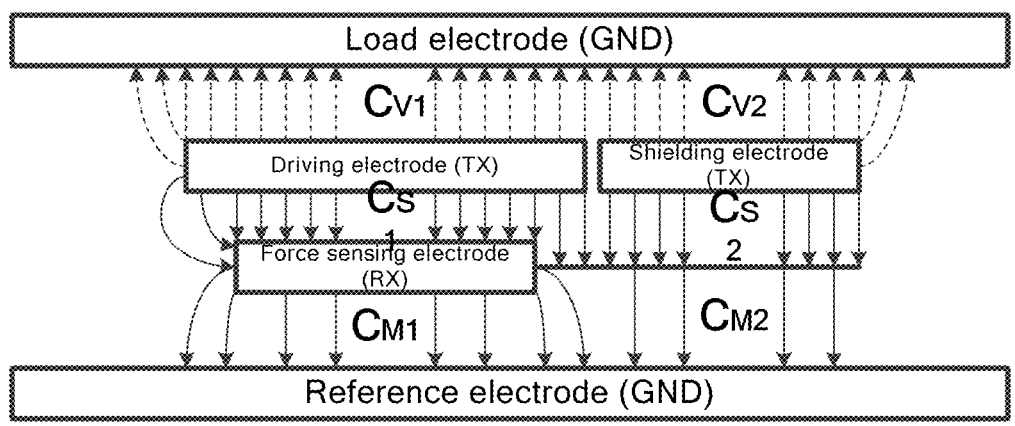
FIG. 16 is a schematic diagram of an electric field of a force detection apparatus based on the sixteenth embodiment of the present application.

FIG. 15 is a schematic diagram of a laminated structure of a force detection apparatus based on the fifteenth embodiment of the present application. FIG. 16 is a schematic diagram of an electric field of a force detection apparatus based on the sixteenth embodiment of the present application. As illustrated in FIG. 15 and FIG. 16, an area of the driving electrode 101 is greater than that of the force sensing electrode 102. In addition, the scenario where a load capacitor may be present between wiring of the force sensing electrode 102 and the load electrode 104, for example, the Vcom layer is considered. In this case, in this embodiment, a shielding electrode 105 is further arranged between the wiring of the force sensing electrode 102 and the load electrode 104, for example, the Vcom layer, where the shielding electrode 105 is configured to shield the load capacitor $C_L$ formed between the wiring of the force sensing electrode 102 and the load electrode 104. The shielding electrode 105 is arranged between the wiring of the force sensing electrode and the load electrode. The shielding electrode 105 and the driving electrode may be arranged on the same layer, or may be up-to-down staggered. When a driving signal is loaded to the driving electrode 101, the driving signal is simultaneously loaded to the shielding electrode 105, and an output electrical signal of the voltage dividing capacitor $C_S$ formed between the driving electrode 101 and the force sensing electrode 102 and between the shielding electrode 105 and the force sensing electrode 102 respectively, and an output electrical signal of the force detecting capacitor $C_M$ formed between the force sensing electrode 102 and the reference electrode 103 are respectively obtained.

As illustrated in FIG. 16, when the driving electrode 101 and the shielding electrode 105 are electrically connected to the driving signal, an environment detecting capacitor $C_{V1}$ is formed between the driving electrode 101 and the load electrode 104, the environment detecting capacitor $C_{V2}$ is formed between the shielding electrode 105 and the load electrode 104, voltage detecting capacitors $C_{M1}$ and $C_{M2}$ are respectively formed between the force sensing electrode 102 and the reference electrode 103 and between the wiring of the force sensing electrode 102 and the reference electrode 103, a voltage dividing capacitor $C_{S1}$ is formed between the driving electrode 101 and the force sensing electrode 102, and a voltage dividing capacitor $C_{S2}$ is formed between the shielding electrode 105 and the wiring of the force sensing electrode 102. A sum of the environment detecting capacitor $C_{V1}$ and the environment detecting capacitor $C_{V2}$ is equal to the environment detecting capacitor $C_V$ in the above embodiment, which do not participate in determination of the force feature data; a sum of the voltage dividing capacitor $C_{S1}$ and the voltage dividing capacitor $C_{S2}$ is equal to the voltage dividing capacitor $C_S$ in the above formula for determining the force feature data; and a sum of the force detecting capacitor $C_{M1}$ and the force detecting capacitor $C_{M2}$ is equal to the force detecting capacitor $C_M$ in the above formula for determining the force feature data.

Specifically, in this embodiment, when the driving electrode 101 is electrically connected to the driving signal, the driving signal is simultaneously loaded to the shielding electrode 105. Driving capabilities of a driving circuit are considered. For example, in a driving circuit, if a single driving channel has a strong driving capability, one driving channel may be used to simultaneously loading the same driving signal to both the driving electrode 101 and the shielding electrode 105; or if a single driving channel has a weak driving capability, two driving channels may be used to respectively load driving signals with the same attributes (frequency, amplitude, phase and the like) to the driving electrode 101 and the shielding electrode 105.

In addition, if a single driving channel has a driving capability sufficient to simultaneously drive a plurality of driving electrodes 101 and a plurality of shielding electrodes 105, one driving channel may be used to simultaneously load driving signals to the plurality of driving electrodes 101 and the plurality of shielding electrodes 105. In this way, the number of driving channels may be decreased as much as possible.

Further, alternatively, in another embodiment, the driving electrode 101 and the shielding electrode 105 may be arranged on the same layer. Since the same driving signal is loaded to the driving electrode 101 and the shielding electrode 105, the driving electrode 101 may also be directly connected to the shielding electrode 105, and then a driving signal is loaded to the driving electrode 101 and the shielding electrode 105 by using one driving channel.

The force detection apparatus as illustrated in FIG. 15 may also employ the force detection method and the solution for determining the force value as described above, which are not described herein any further.

Figure 17:
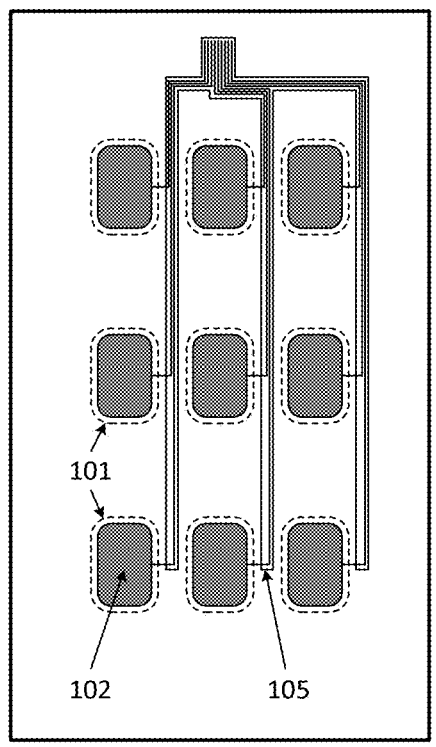
FIG. 17 is a schematic planar diagram of a force detection apparatus based on the seventeenth embodiment of the present application.
Figure 18:
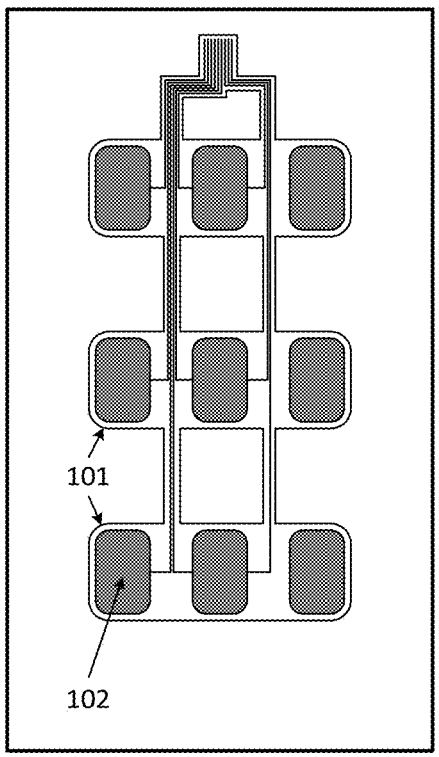
FIG. 18 is a schematic planar diagram of a force detection apparatus based on the eighteenth embodiment of the present application.

FIG. 17 is a schematic planar diagram of a force detection apparatus based on the seventh embodiment of the present application. FIG. 18 is a schematic planar diagram of a force detection apparatus based on the 18th embodiment of the present application. In FIG. 17 and FIG. 18, for clear illustration of the schematic diagram of the shielding electrode 105 and the wiring thereof, other parts are not shown in the drawings, which are not described herein any further.

As illustrated in FIG. 17, a shielding electrode 105 is correspondingly arranged for wiring of each force sensing electrode 102, the plurality of shielding electrodes 105 share one driving channel, the plurality of driving electrodes 101 may share one driving channel, and a shielding electrode 105 and a driving electrode 101 may share one driving channel.

As illustrated in FIG. 18, an area of a force sensing electrode 102 is greater than the driving electrode 101 is arranged, such that the driving electrode 101 forms the voltage dividing capacitor $C_S$ with the force sensing electrode 102 and the wiring thereof, and the force sensing electrode 102 and the wiring thereof form the voltage detecting capacitor $C_M$ with the reference electrode 103.

Figure 19:
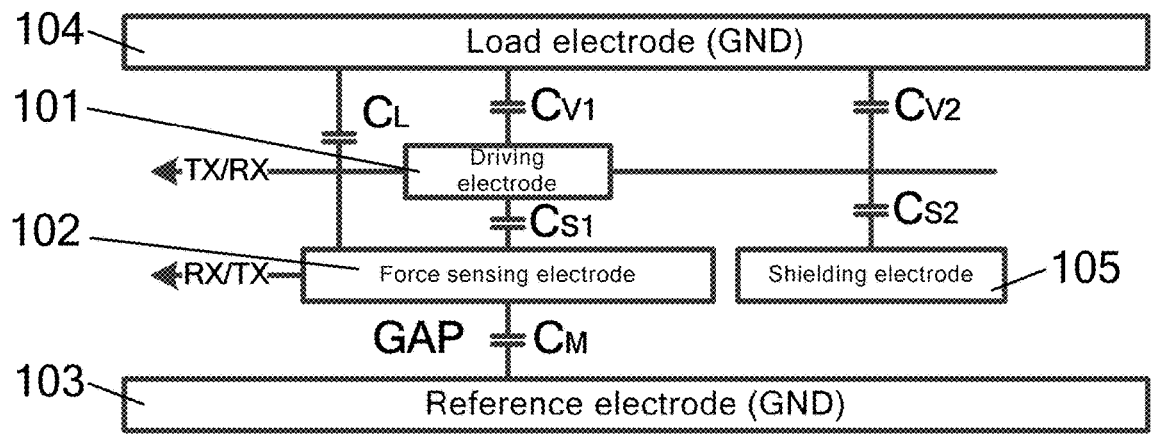
FIG. 19 is a schematic laminated diagram of a force detection apparatus based on the nineteenth embodiment of the present application.

FIG. 19 is a schematic laminated diagram of a force detection apparatus based on the nineteenth embodiment of the present application. As illustrated in FIG. 19, in this embodiment, the area of the driving electrode 101 is smaller than that of the force sensing electrode 102. In this case, the load capacitor $C_L$ is formed between the force sensing electrode 102 and the load electrode 104, for example, the Vcom layer. In addition, the environment interference capacitor formed by the wiring of the driving electrode 101 and the reference electrode is considered, and the impacts caused thereby to the environment feature data are eliminated. In this embodiment, the shielding electrode 105 is arranged between the wiring of the driving electrode 101 and the reference electrode 103. The shielding electrode 105 is configured to shield the environment interference capacitor formed between the wiring of the driving electrode 101 and the reference electrode 103. The shielding electrode 105 is arranged between the wiring of the driving electrode 101 and the reference electrode 103. The shielding electrode 105 and the force sensing electrode 102 may be arranged on the same layer, or may be up-to-down staggered. In this embodiment, the shielding electrode 105 and the force sensing electrode 102 may be located in the same layer.

Figure 20:
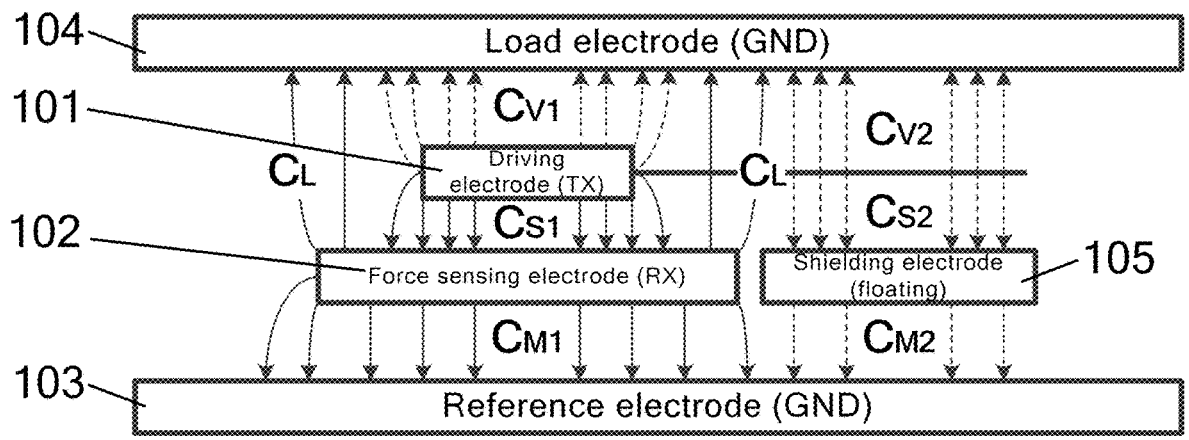
FIG. 20 is a schematic diagram of an electric field of a force detection apparatus based on the twentieth embodiment of the present application.
Figure 21:
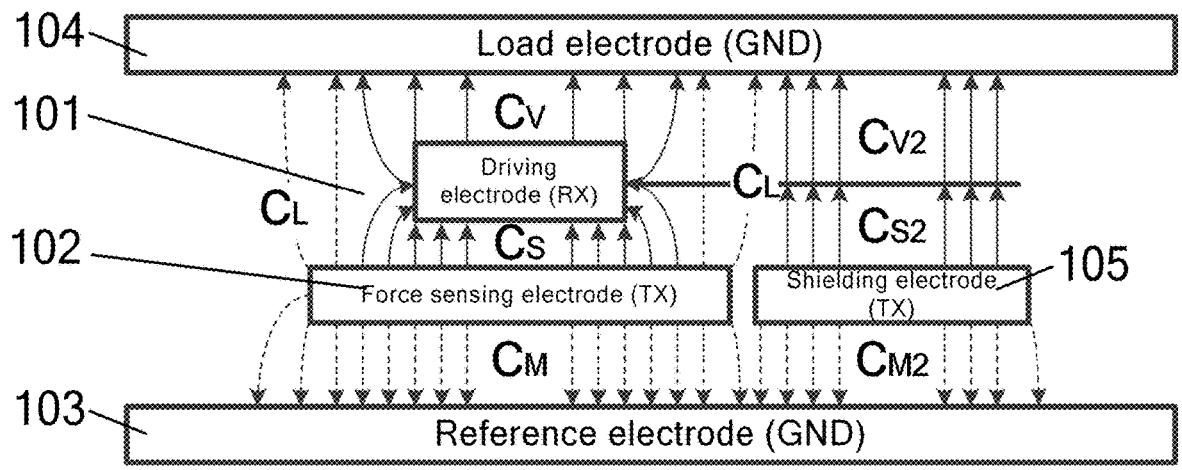
FIG. 21 is a schematic diagram of an electric field of a force detection apparatus based on the twenty-first embodiment of the present application.

FIG. 20 is a schematic diagram of an electric field of a force detection apparatus based on the twentieth embodiment of the present application. FIG. 21 is a schematic diagram of an electric field of a force detection apparatus based on the twenty-first embodiment of the present application. FIG. 20 and FIG. 21 are schematic diagrams of electric fields corresponding to FIG. 19. Referring to the above embodiments where the load capacitor $C_L$ is present, to eliminate the impacts caused by the load capacitor $C_L$, a driving signal is loaded to the driving electrode 101, the shielding electrode 105 is caused to be in a floating state, and the sensing electrode of the force sensing electrode 102 is detected. The driving signal is loaded to the force sensing electrode 102 and the shielding electrode 105, and the sensing signal of the driving electrode 101 is detected.

Specifically, when the shielding electrode is in the floating state, the output electrical signal of the voltage dividing capacitor $C_S$ formed between the driving electrode 101 and the force sensing electrode 102, the output electrical signal of the force detecting capacitor $C_M$ formed between the force sensing electrode 102 and the reference electrode 103, and the output electrical signal of the load capacitor $C_L$ formed between the force sensing electrode 102 and the load electrode 104 are respectively acquired based on the driving signal loaded to the driving electrode 101 and the detected sensing signal output by the force sensing electrode 102.

The output electrical signals of the voltage dividing capacitors $C_S$ formed between the driving electrode 101 and the wiring thereof and the force sensing electrode 102, and between the driving electrode 101 and the wiring thereof and the shielding electrode 105, and the output electrical signal of the environment detecting capacitor $C_V$ formed between the driving electrode 101 and the wiring thereof and the load electrode 104 are respectively acquired based on the driving signal to which the force sensing electrode 102 and the shielding electrode 105 are electrically connected and the detected sensing signal output by the driving electrode 101.

In this embodiment, due to presence of the shielding electrode 105, when the driving signal is loaded to the driving electrode 101, the shielding electrode 105 is in the floating state; whereas when the driving signal is loaded to the force sensing electrode 102, the same driving signal is simultaneously loaded to the shielding electrode 105.

In FIG. 20 and FIG. 21, the environment detecting capacitor $C_V$ in the formula for determining the force feature data is obtained by summing the environment detecting capacitor $C_{V1}$ and the environment detecting capacitor $C_{V2}$, the voltage dividing capacitor $C_S$ in the formula for determining the force feature data is obtained by summing the voltage dividing capacitor $C_{S1}$ and the voltage dividing capacitor $C_{S2}$, and the force detecting capacitor $C_M$ in the formula for determining the force feature data is obtained by summing the force detecting capacitor $C_{M1}$ and the force detecting capacitor $C_{M1}$, $C_V$, $C_S$, $C_M$ and $C_L$ obtained herein are introduced into formula (14) and formula (15) to calculate the force feature data. The force value F may be further determined by using formula (8).

Figure 22:
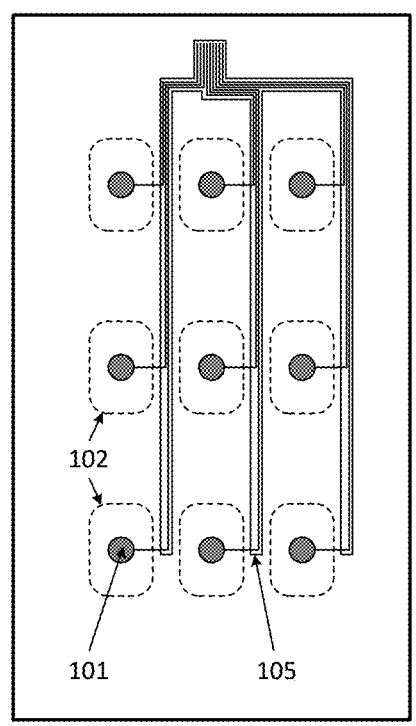
FIG. 22 is a schematic planar diagram of a force detection apparatus based on the twenty-second embodiment of the present application.

FIG. 22 is a schematic planar diagram of a force detection apparatus based on the twenty-second embodiment of the present application. As illustrated in FIG. 22, with respect to the laminated structure of the force detection apparatus as illustrated in FIG. 19, for a clear illustration of the relationship between the driving electrode 101, the force sensing electrode 102 and the shielding electrode 105, the other relevant parts are not shown. A shielding electrode 105 is arranged for wiring of each force sensing electrode 102, and a plurality of shielding electrodes 105 may share one driving channel, or different driving channels may be individually arranged. The force sensing electrode 102 and the shielding electrode 106 may share one driving channel, or different driving channels may be individually arranged. The number of driving channels may be specifically based on the driving capability.

In another embodiment, a force sensing electrode 102 having a greater area may be arranged, such that the force sensing electrode 102 meanwhile achieves the technical effect of the shielding electrode 105 in this embodiment, which is not described herein any further.

Figure 23:
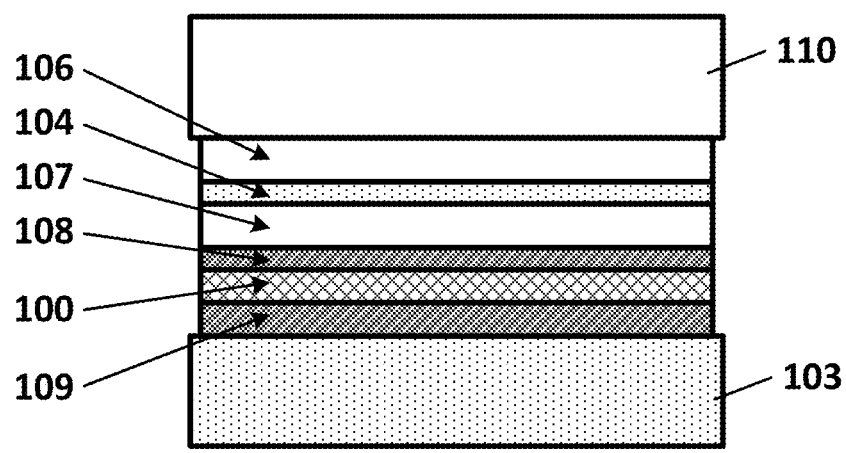
FIG. 23 is a schematic structural diagram of an application example of a force detection apparatus based on the twenty-third embodiment of the present application.

FIG. 23 is a schematic structural diagram of an application example of a force detection apparatus based on the twenty-third embodiment of the present application. As illustrated in FIG. 23, in practical application, the driving electrode 101, the force sensing electrode 102 and the like may be made to a sensor 100; and a conductive middle frame of an electronic terminal where the force detection apparatus is located is the reference electrode 103, to form the above force detection apparatus. In the sensor 100, a lower foam 109 and the like filler may be arranged between the force sensing electrode in the sensor 100 and the conductive middle frame. A Vcom layer is present between a lower glass 107 and an upper glass 106, where the upper glass 106 and a cover 110 are sequentially arranged on the Vcom layer.

An upper foam 108 and the like filler are arranged between the sensor 100 and the lower glass 107, such that a deformation caused by a user's force is transferred to the sensor 100 without any loss.

Figure 24:
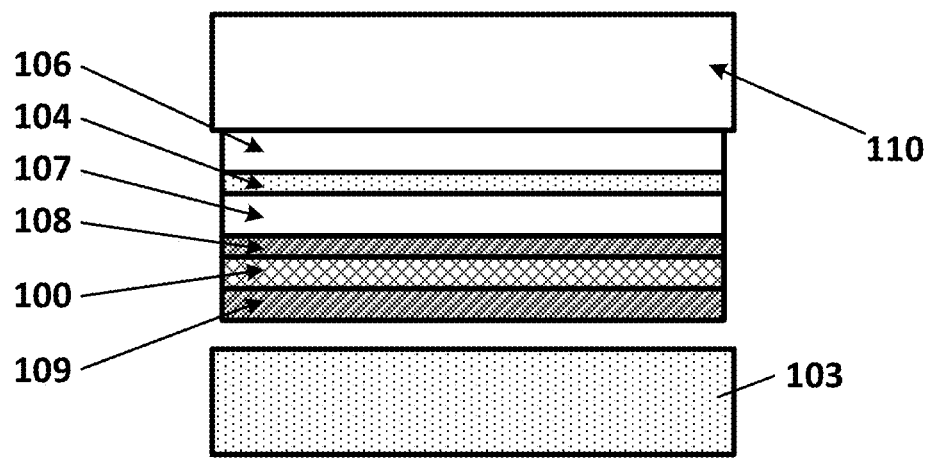
FIG. 24 is a schematic structural diagram of an application example of a force detection apparatus based on the twenty-forth embodiment of the present application.

FIG. 24 is a schematic structural diagram of an application example of a force detection apparatus based on the twenty-forth embodiment of the present application. As illustrated in FIG. 24, different from the embodiment as illustrated in FIG. 23, a lower foam 109 is arranged between the force sensing electrode in the sensor 100 and the conductive middle frame, such that an air gap is present between the lower foam 109 and the conductive middle frame. In this way, the deformation amount of the force sensing capacitor when a force is applied is increased.

Figure 25:
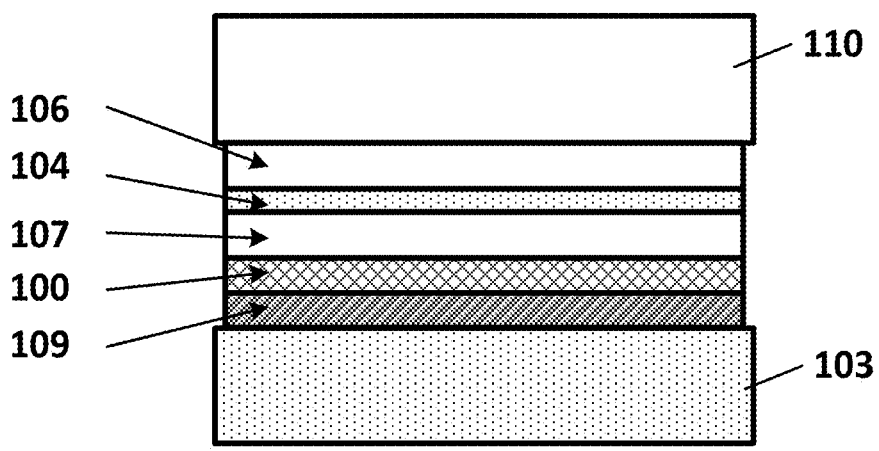
FIG. 25 is a schematic structural diagram of an application example of a force detection apparatus based on the twenty-fifth embodiment of the present application.

FIG. 25 is a schematic structural diagram of an application example of a force detection apparatus based on the twenty-fifth embodiment of the present application. As illustrated in FIG. 25, different from the embodiment as illustrated in FIG. 24, the upper foam 108 and the like filler do not need to be arranged between the sensor 100 and the lower glass 107, and the sensor 100 is directly arranged on a lower surface of the lower glass 107. That is, the force sensing electrode and the driving electrode are sandwiched between a filler deformable with the force, for example, the upper foam, and a substrate substantially deformable with the force, for example, the lower glass. The filler between the driving electrode and the force sensing electrode may also be designed to a hollow structure, to adjust, for example, decrease, the capacitance of the voltage dividing capacitor formed between the driving electrode and the force sensing electrode.

Figure 26:
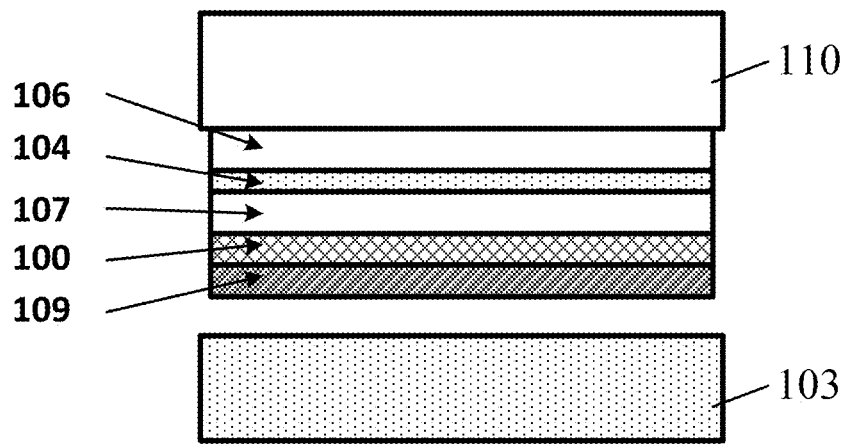
FIG. 26 is a schematic structural diagram of an application example of a force detection apparatus based on the twenty-sixth embodiment of the present application.

FIG. 26 is a schematic structural diagram of an application example of a force detection apparatus based on the twenty-sixth embodiment of the present application. As illustrated in FIG. 26, different from the embodiment as illustrated in FIG. 25, a lower foam 109 is arranged between the sensor 100 and the conductive middle frame, such that an air gap is maintained between the lower foam 109 and the conductive middle frame. In this way, the deformation amount of the force sensing capacitor when a force is applied is increased.

In the schematic structural diagram of the application example as illustrated in FIG. 23 to FIG. 26, the sensor may include an upper-layer electrode and a lower-layer electrode, that is, a driving electrode and a force sensing electrode. In this case, with the driving electrode, the load capacitor between the Vcom layer and the force sensing electrode in the related art is not needed, and the load capacitor is eliminated during determination of the force feature data.

In addition, it should be noted that in the above structure having two layers of electrodes, another conductive metal layer, for example, the load electrode, over the force sensing electrode may also be the driving electrode, such that the load capacitor is not formed, and the load capacitor is likewise eliminated during determination of the force feature data. If the other metal layer is the driving electrode, the sensor includes only a single-layer electrode: the force sensing electrode.

Figure 27:
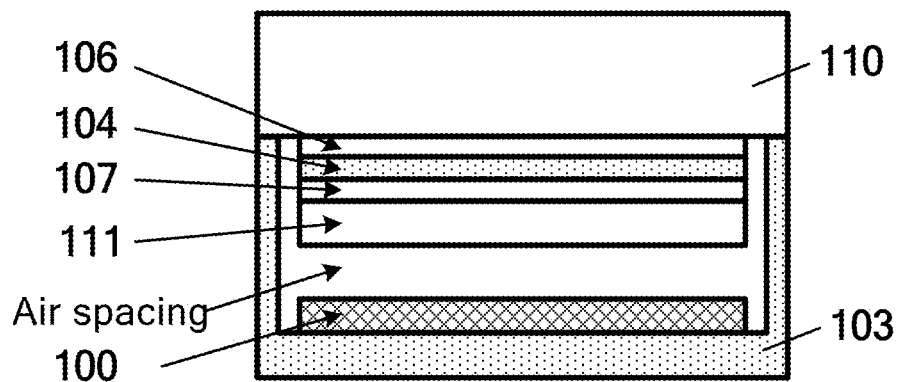
FIG. 27 is a schematic structural diagram of an application example of a force detection apparatus based on the twenty-seventh embodiment of the present application.

FIG. 27 is a schematic structural diagram of an application example of a force detection apparatus based on the twenty-seventh embodiment of the present application. In this embodiment, since an optical element 111 is present and the lower glass 107, the Vcom layer, the upper glass 106 and the cover 110 are sequentially arranged above the optical element 111, a metal back shell may be present. The metal back shell is used as the load electrode 104, and the Vcom layer is used as the reference electrode 103. An air gap is present between the Vcom layer and the force sensing electrode 102 in the sensor 100, such that the force detecting capacitor $C_M$ is formed.

Figure 28:
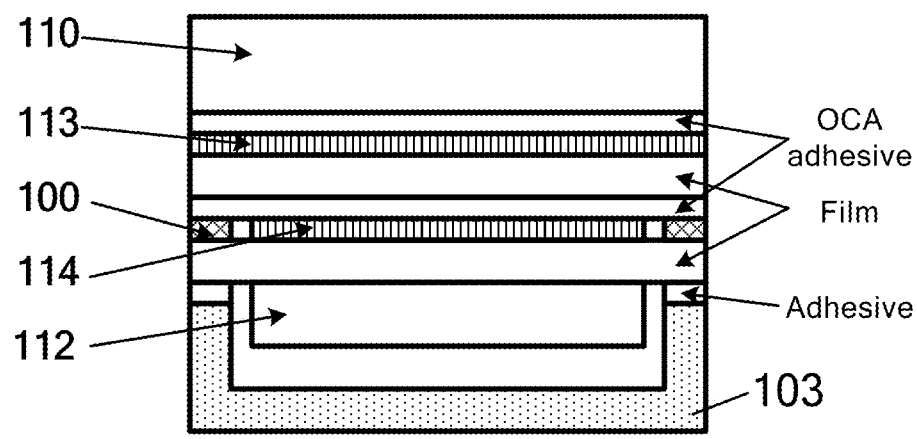
FIG. 28 is a schematic structural diagram of an application example of a force detection apparatus based on the twenty-eighth embodiment of the present application.

FIG. 28 is a schematic structural diagram of an application example of a force detection apparatus based on the twenty-eighth embodiment of the present application. In this embodiment, the middle frame is used as the reference electrode 103, and a compressible flexible adhesive is present between the force sensing electrode 102 in the sensor 100 and the middle frame to form the force detecting capacitor $C_M$. In addition, since a touch sensing array 113 configured to sense a touch operation is also present, the driving electrode 101 may be the electrode in the touch sensing array 113. The force sensing electrode 102 and the driving electrode 101 are both located arranged on the periphery of an effective display region of the electronic terminal where the force detection apparatus is located.

Figure 29:
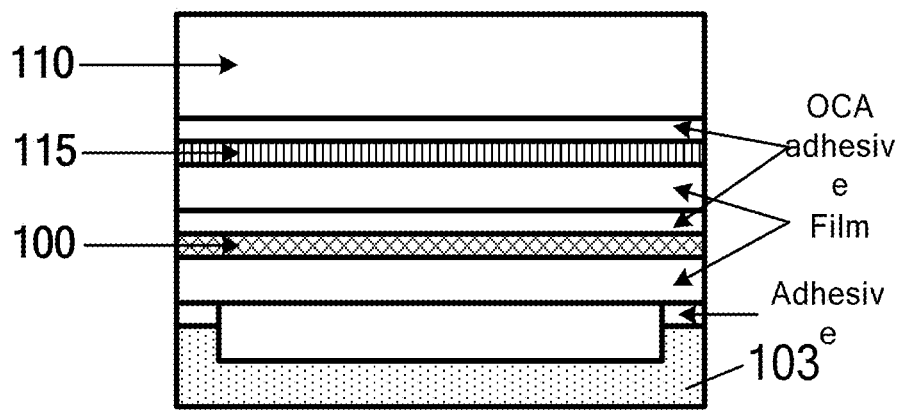
FIG. 29 is a schematic structural diagram of an application example of a force detection apparatus based on the twenty-ninth embodiment of the present application.
Figure 30:
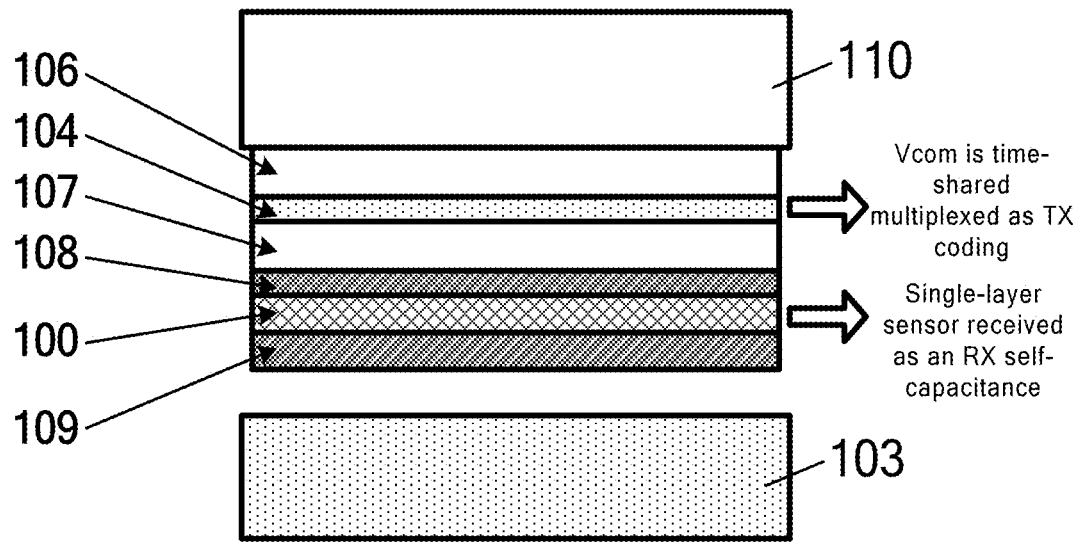
FIG. 30 is a schematic structural diagram of an application example of a force detection apparatus based on the thirtieth embodiment of the present application.

FIG. 29 is a schematic structural diagram of an application example of a force detection apparatus based on the twenty-ninth embodiment of the present application. As illustrated in FIG. 29, in this embodiment, with respect to the scenario where a virtual key electrode 115 is arranged correspondingly because a virtual key is arranged, the driving electrode 101 may be the virtual key electrode 115. $p$ FIG. 30 is a schematic structural diagram of an application example of a force detection apparatus based on the thirtieth embodiment of the present application. As illustrated in FIG. 30, in this embodiment, the sensor 100 includes the force sensing electrode 102, and the driving electrode 101 in the sensor 100 is the load electrode 104, for example, the Vcom layer. Through time-shared control, the Vcom layer may be used as the driving electrode 101 in one aspect, and may achieve the effect of the Vcom layer in the related art in another aspect.

Figure 31:
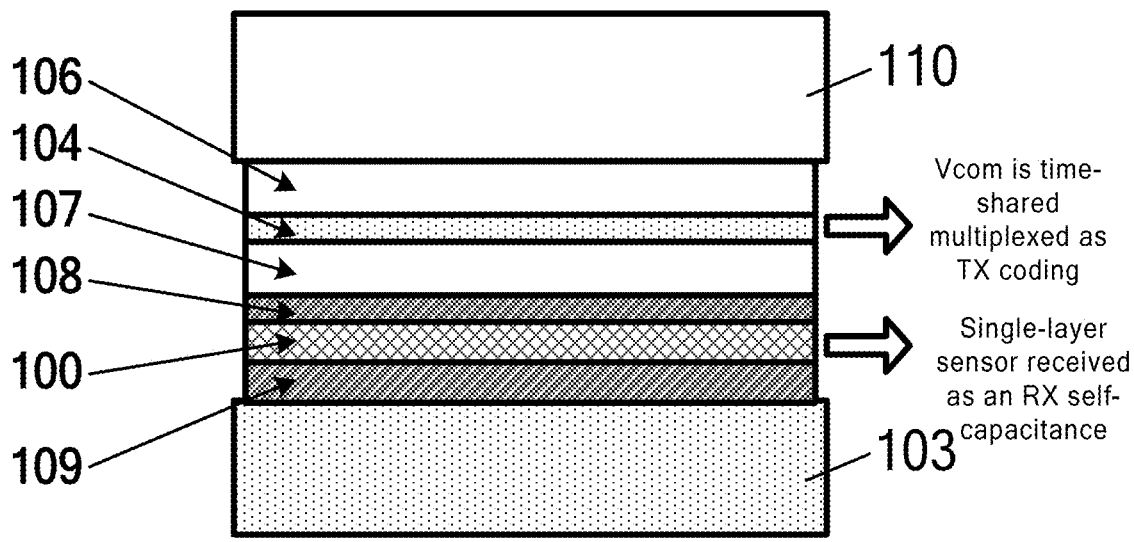
FIG. 31 is a schematic structural diagram of an application example of a force detection apparatus based on the thirty-first embodiment of the present application.

FIG. 31 is a schematic structural diagram of an application example of a force detection apparatus based on the thirty-first embodiment of the present application. As illustrated in FIG. 31, different from FIG. 30, an air gap similar to that in FIG. 20 is arranged.

Referring to the above relevant embodiments, the driving electrode and the force sensing electrode are both in a rectangular shape; or the driving electrode is in a circular shape, and the force sensing electrode is in a rectangular shape.

An embodiment of the present application further provides an electronic terminal. The electronic terminal includes the force detection apparatus based on any of the embodiments. The electronic terminal may be specifically a watch, a tablet computer, a touch panel, a force gauge, a mobile phone or the like.

The apparatus based on the embodiments of the present application may be practiced by a computer program. A person skilled in the art should understand the above division of units and modules is only an exemplary one, and if the apparatus is divided into other units or modules or not divided, the technical solution shall also fall within the protection scope of the present application as long as the information object has the above functions.

A person skilled in the art shall understand that the embodiments of the present application may be described to illustrate methods, apparatuses (devices), or computer program products. Therefore, hardware embodiments, software embodiments, or hardware-plus-software embodiments may be used to illustrate the present application. In addition, the present application may further employ a computer program product which may be implemented by at least one non-transitory computer-readable storage medium with an executable program code stored thereon. The non-transitory computer-readable storage medium comprises but not limited to a disk memory, a CD-ROM, and an optical memory.

The present application is described based on the flowcharts and/or block diagrams of the method, apparatus (device), and computer program product. It should be understood that each process and/or block in the flowcharts and/or block diagrams, and any combination of the processes and/or blocks in the flowcharts and/or block diagrams may be implemented using computer program instructions. These computer program instructions may be issued to a computer, a dedicated computer, an embedded processor, or processors of other programmable data processing device to generate a machine, which enables the computer or the processors of other programmable data processing devices to execute the instructions to implement an apparatus for implementing specific functions in at least one process in the flowcharts and/or at least one block in the block diagrams.

These computer program instructions may also be stored a non-transitory computer-readable memory capable of causing a computer or other programmable data processing devices to work in a specific mode, such that the instructions stored on the non-transitory computer-readable memory implement a product comprising an instruction apparatus, where the instruction apparatus implements specific functions in at least one process in the flowcharts and/or at least one block in the block diagrams.

These computer program instructions may also be stored on a computer or other programmable data processing devices, such that the computer or the other programmable data processing devices execute a series of operations or steps to implement processing of the computer. In this way, the instructions, when executed on the computer or the other programmable data processing devices, implement the specific functions in at least one process in the flowcharts and/or at least one block in the block diagrams.

Although the preferred embodiments of the present application are described above, once knowing the basic creative concept, a person skilled in the art can make other modifications and variations to these embodiments. Therefore, the appended claims are intended to be construed as covering the preferred embodiments and all the modifications and variations falling within the scope of the present application. Obviously, a person skilled in the art can make various modifications and variations to the present application without departing from the spirit and scope of the present application. In this way, the present application is intended to cover the modifications and variations if they fall within the scope of the appended claims of the present application and equivalent technologies thereof.

What is claimed is:

1. A force detection method, comprising:
acquiring an output electrical signal of a voltage dividing capacitor formed between a driving electrode and a force sensing electrode, and an output electrical signal of a force detecting capacitor formed between the force sensing electrode and a reference electrode, wherein a gap variable with force is present between the sensing electrode and the reference electrode; and
determining force feature data when a force is applied to the force sensing electrode based on the output electrical signal of the voltage dividing capacitor and the output electrical signal of the force detecting capacitor,
wherein the acquiring an output electrical signal of a voltage dividing capacitor comprises:
acquiring a reference output electrical signal of the voltage dividing capacitor in a predetermined fixed environment;
acquiring a real-time output electrical signal of the voltage dividing capacitor in a current environment;
dividing the real-time output electrical signal by the reference output electrical signal to acquire a first variation factor of the output electrical signal of the voltage dividing capacitor affected by environmental change from the predetermined fixed environment to the current environment; and
calibrating the output electrical signal of the voltage dividing capacitor based on the first variation factor to determine the force feature data when a force is applied to the force sensing electrode based on the calibrated output electrical signal of the voltage dividing capacitor and the output electrical signal of the force detecting capacitor,
wherein the acquiring an output electrical signal of a force detecting capacitor comprises:
acquiring a second variation factor of the output electrical signal of the force detecting capacitor affected by the environmental change based on the first variation factor of the output electrical signal of the voltage dividing capacitor affected by the environmental change;
calibrating the output electrical signal of the force detecting capacitor based on the second variation factor of the output electrical signal of the force detecting capacitor affected by the environmental change; or determining a third variation factor of the force feature data affected by the environmental change based on the first variation factor of the output electrical signal of the voltage dividing capacitor affected by the environmental change and the second variation factor of the output electrical signal of the force detecting capacitor affected by the environmental change; and
the determining force feature data when a force is applied to the force sensing electrode based on the output electrical signal of the voltage dividing capacitor and the output electrical signal of the force detecting capacitor comprises: determining the force feature data when a force is applied to the force sensing electrode based on the calibrated output electrical signal of the voltage dividing capacitor and the calibrated output electrical signal of the force detecting capacitor; or determining the force feature data when a force is applied to the force sensing electrode based on the third variation factor of the force feature data affected by the environmental change, the output electrical signal of the voltage dividing capacitor and the output electrical signal of the force detecting capacitor.

2. The method of claim 1, wherein the driving electrode is electrically connected to a driving signal, and the force sensing electrode outputs a sensing signal coupled to the driving signal, and respectively acquires the output electrical signal of the voltage dividing capacitor and the output electrical signal of the force detecting capacitor in a self-capacitance detection mode or detecting the output electrical signal of the voltage dividing capacitor formed between the driving electrode and the force sensing electrode individually in a mutual-capacitance detection mode.

3. The method of claim 1, wherein an area of the driving electrode is smaller than that of the force sensing electrode, a load capacitor is formed by the force sensing electrode and a load electrode, and respectively acquiring the output electrical signal of the voltage dividing capacitor formed between the driving electrode and the force sensing electrode, the output electrical signal of the force detecting capacitor formed between the force sensing electrode and the reference electrode, and the output electrical signal of the load capacitor formed between the force sensing electrode and the load electrode according to the driving signal to which the driving electrode is electrically connected; or
the driving electrode is arranged between the force sensing electrode and a load electrode, an area of the driving electrode is greater than that of the force sensing electrode and the driving electrode totally covers the force sensing electrode to shield a load capacitor formed between the force sensing electrode and the load electrode.

4. The method of claim 3, further comprising: a shielding electrode; wherein the shielding electrode is configured to shield a load capacitor formed between conducting wire of the force sensing electrode and the load electrode, the driving electrode is electrically connected to the driving signal, and the shielding electrode is as well as electrically connected to the driving signal to acquire the output electrical signal of the voltage dividing capacitors formed between the driving electrode and the force sensing electrode, and between the shielding electrode and the force sensing electrode, and the output electrical signal of the voltage detecting capacitor formed between the force sensing electrode and the reference electrode.

5. The method of claim 3, further comprising:
acquiring an output electrical signal of an environment detecting capacitor formed between the driving electrode and the load electrode;
dividing a signal value of the output electrical signal of the environment detecting capacitor by a sum of signal values of the output electrical signal of the voltage dividing capacitor and the output electrical signal of the environment detecting capacitor to determine a second voltage division ratio; and
determining environment feature data based on the second voltage division ratio.

6. The method of claim 5, wherein the determining force feature data when a force is applied to the force sensing electrode based on the output electrical signal of the voltage dividing capacitor and the output electrical signal of the force detecting capacitor comprises:

calculating a first raw force feature data based on a ratio of the signal value of the output electrical signal of the voltage dividing capacitor to the sum of the signal values of the output electrical signals of the force detecting capacitor, the load capacitor and the voltage dividing capacitor; and using the environment feature data as a second raw force feature data, and determining the force feature data generated when a force is applied to the force sensing electrode based on the first raw force feature data and the second raw force feature data.

7. The method of claim 3, further comprising: a shielding electrode, configured to shield an environment interference capacitor formed between conducting wire of the driving electrode and the reference electrode, wherein when the shielding electrode is in a floating state, the output electrical signal of the voltage dividing capacitor formed between the driving electrode and the force sensing electrode, the output electrical signal of the force detecting capacitor formed between the force sensing electrode and the reference electrode, and the output electrical signal of the load capacitor formed between the force sensing electrode and the load electrode are respectively acquired based on the driving signal to which the driving electrode is electrically connected and the detected sensing signal output by the force sensing electrode; and the output electrical signals of the voltage dividing capacitors formed between the driving electrode and the force sensing electrode, and between the driving electrode and the shielding electrode, and the output electrical signal of the environment detecting capacitor formed between the driving electrode and the load electrode are respectively acquired based on the driving signal to which the force sensing electrode and the shielding electrode are electrically connected and the detected sensing signal output by the driving electrode.

8. The method of claim 1, wherein the determining force feature data when a force is applied to the force sensing electrode based on the output electrical signal of the voltage dividing capacitor and the output electrical signal of the force detecting capacitor comprises:

dividing a signal value of the output electrical signal of the force detecting capacitor CM by a sum of signal values of the output electrical signal of the voltage dividing capacitor CS and the output electrical signal of the force detecting capacitor CM to determine a first voltage division ratio; and determining the force feature data when a force is applied to the force sensing electrode based on the first voltage division ratio.

9. The method of claim 1, further comprising: determining a force corresponding to the force feature data based on the force feature data when a force is applied to the force sensing electrode in the current environment and reference force feature data when no force is applied to the force sensing electrode in the current environment.

10. A force detection apparatus, comprising:
a driving electrode;
a force sensing electrode; and
a reference electrode;
wherein a voltage dividing capacitor is formed between the driving electrode and the force sensing electrode, a force detecting capacitor is formed between the force sensing electrode and the reference electrode, a gap variable with force is present between the force sensing electrode and the reference electrode, and the voltage dividing capacitor and the force detecting capacitor are respectively configured to determine an output electrical signal of force feature data when a force is applied to the force sensing electrode, and wherein the force detection apparatus is configured to acquire an output electrical signal of the voltage dividing capacitor formed between the driving electrode and the force sensing electrode, and the operation of acquiring an output electrical signal of the voltage dividing capacitor further comprises:

acquiring a reference output electrical signal of the voltage dividing capacitor in a predetermined fixed environment;

acquiring a real-time output electrical signal of the voltage dividing capacitor in a current environment;

dividing the real-time output electrical signal by the reference output electrical signal to acquire a first variation factor of the output electrical signal of the voltage dividing capacitor affected by environmental change from the predetermined fixed environment to the current environment; and calibrating the output electrical signal of the voltage dividing capacitor based on the first variation factor to determine the force feature data when a force is applied to the force sensing electrode based on the calibrated output electrical signal of the voltage dividing capacitor and the output electrical signal of the force detecting capacitor, wherein the force detection apparatus is configured to the acquire an output electrical signal of a force detecting capacitor formed between the force sensing electrode and a reference electrode, and the operation of acquiring an output electrical signal of a force detecting capacitor further comprises:

acquiring a second variation factor of the output electrical signal of the force detecting capacitor affected by the environmental change based on the first variation factor of the output electrical signal of the voltage dividing capacitor affected by the environmental change;

calibrating the output electrical signal of the force detecting capacitor based on the second variation factor of the output electrical signal of the force detecting capacitor affected by the environmental change; or determining a third variation factor of the force feature data affected by the environmental change based on the first variation factor of the output electrical signal of the voltage dividing capacitor affected by the environmental change and the second variation factor of the output electrical signal of the force detecting capacitor affected by the environmental change; and the determining force feature data when a force is applied to the force sensing electrode based on the output electrical signal of the voltage dividing capacitor and the output electrical signal of the force detecting capacitor comprises: determining the force feature data when a force is applied to the force sensing electrode based on the calibrated output electrical signal of the voltage dividing capacitor and the calibrated output electrical signal of the force detecting capacitor; or determining the force feature data when a force is applied to the force sensing electrode based on the third variation factor of the force feature data affected by the environmental change, the output electrical signal of the voltage dividing capacitor and the output electrical signal of the force detecting capacitor.

11. The apparatus of claim 10, wherein the driving electrode is electrically connected to a driving signal, the force sensing electrode outputs a sensing signal coupled to the driving signal, and the voltage dividing capacitor and the force detecting capacitor respectively generate in a self-capacitance detection mode the corresponding output electrical signal when a force is applied to the force sensing electrode or the voltage dividing capacitor generates in a mutual-capacitance detection mode the corresponding output electrical signal when a force is applied to the force sensing electrode.

12. The apparatus of claim 11, wherein an area of the driving electrode is smaller than that of the force sensing electrode, such that a load capacitor is formed between the force sensing electrode and a load electrode; or
the driving electrode is arranged between the force sensing electrode and a load electrode, an area of the driving electrode is greater than that of the force sensing electrode and the driving electrode covers the force sensing electrode totally to shield a load capacitor formed between the force sensing electrode and the load electrode.

13. The apparatus of claim 12, further comprising a shielding electrode configured to shield a load capacitor formed between conducting wire of the force sensing electrode and the load electrode; wherein the shielding electrode is arranged between the conducting wire of the force sensing electrode and the load electrode; or
further comprising a shielding electrode configured to shield an environment interference capacitor formed between conducting wire of the driving electrode and the reference electrode; wherein the shielding electrode is arranged between the conducting wire of the force sensing electrode and the reference electrode.

14. The apparatus of claim 12, wherein the driving electrode is a common electrode in a display module of an electronic apparatus where the force detection apparatus is located, or the driving electrode is arranged between the force sensing electrode and the load electrode; or the driving electrode is an electrode in a touch sensing array of an electronic apparatus where the force detection apparatus is located.

15. The apparatus of claim 10, wherein the reference electrode is a conductive middle frame of an electronic terminal where the force detection apparatus is located; or the reference electrode is a conductive back shell of an electronic terminal where the force detection apparatus is arranged; or the reference electrode is a common electrode in a display module of an electronic terminal where the force detection apparatus is located.

16. The apparatus of claim 10, wherein a filler between the driving electrode and the force sensing electrode is hollow to adjust the capacitance of the voltage dividing capacitor formed between the driving electrode and the force sensing electrode.

17. The apparatus of claim 10, wherein the driving electrode and the force sensing electrode are arranged on the periphery of an effective display region of the electronic terminal where the force detection apparatus is located.

18. An electronic terminal comprising a force detection apparatus, wherein the force detection apparatus comprising:
a driving electrode;
a force sensing electrode; and
a reference electrode;
wherein a voltage dividing capacitor is formed between the driving electrode and the force sensing electrode, a force detecting capacitor is formed between the force sensing electrode and the reference electrode, a gap variable with force is present between the force sensing electrode and the reference electrode, and the voltage dividing capacitor and the force detecting capacitor are respectively configured to determine an output electrical signal of force feature data when a force is applied to the force sensing electrode, and
wherein the force detection apparatus is configured to acquire an output electrical signal of the voltage dividing capacitor formed between the driving electrode and the force sensing electrode, and the operation of acquiring an output electrical signal of the voltage dividing capacitor further comprises:
acquiring a reference output electrical signal of the voltage dividing capacitor in a predetermined fixed environment;
acquiring a real-time output electrical signal of the voltage dividing capacitor in a current environment;
dividing the real-time output electrical signal by the reference output electrical signal to acquire a first variation factor of the output electrical signal of the voltage dividing capacitor affected by environmental change from the predetermined fixed environment to the current environment; and
calibrating the output electrical signal of the voltage dividing capacitor based on the first variation factor to determine the force feature data when a force is applied to the force sensing electrode based on the calibrated output electrical signal of the voltage dividing capacitor and the output electrical signal of the force detecting capacitor,
wherein the force detection apparatus is configured to the acquire an output electrical signal of a force detecting capacitor formed between the force sensing electrode and a reference electrode, and the operation of acquiring an output electrical signal of a force detecting capacitor further comprises:
acquiring a second variation factor of the output electrical signal of the force detecting capacitor affected by the environmental change based on the first variation factor of the output electrical signal of the voltage dividing capacitor affected by the environmental change;
calibrating the output electrical signal of the force detecting capacitor based on the second variation factor of the output electrical signal of the force detecting capacitor affected by the environmental change; or determining a third variation factor of the force feature data affected by the environmental change based on the first variation factor of the output electrical signal of the voltage dividing capacitor affected by the environmental change and the second variation factor of the output electrical signal of the force detecting capacitor affected by the environmental change; and
the determining force feature data when a force is applied to the force sensing electrode based on the output electrical signal of the voltage dividing capacitor and the output electrical signal of the force detecting capacitor comprises: determining the force feature data when a force is applied to the force sensing electrode based on the calibrated output electrical signal of the voltage dividing capacitor and the calibrated output electrical signal of the force detecting capacitor; or determining the force feature data when a force is applied to the force sensing electrode based on the third variation factor of the force feature data affected by the environmental change, the output electrical signal of the voltage dividing capacitor and the output electrical signal of the force detecting capacitor.

* * * * *